(12) United States Patent
Papasakellariou et al.

(10) Patent No.: US 10,142,969 B2
(45) Date of Patent: *Nov. 27, 2018

(54) HARQ-ACK SIGNAL TRANSMISSION IN RESPONSE TO DETECTION OF CONTROL CHANNEL TYPE IN CASE OF MULTIPLE CONTROL CHANNEL TYPES

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 141 days.

This patent is subject to a terminal disclaimer.

(21) Appl. No.: 14/878,712

(22) Filed: Oct. 8, 2015

(65) Prior Publication Data
US 2016/0028511 A1    Jan. 28, 2016

Related U.S. Application Data

(63) Continuation of application No. 13/785,769, filed on Mar. 5, 2013, now Pat. No. 9,271,271.
(Continued)

(51) Int. Cl.
*H04L 1/08* (2006.01)
*H04W 72/04* (2009.01)
*H04L 1/18* (2006.01)

(52) U.S. Cl.
CPC ....... *H04W 72/0406* (2013.01); *H04L 1/1812* (2013.01); *H04L 1/1861* (2013.01);
(Continued)

(58) Field of Classification Search
CPC ... H04W 72/04; H04W 72/042; H04W 88/08; H04L 5/0007
See application file for complete search history.

(56) References Cited

U.S. PATENT DOCUMENTS

| | | |
|---|---|---|
| 8,358,630 B2 | 1/2013 | Kim et al. |
| 8,400,908 B2 | 3/2013 | Chun et al. |
| (Continued) | | |

FOREIGN PATENT DOCUMENTS

| | | |
|---|---|---|
| CN | 101442818 | 5/2009 |
| JP | 2015-513863 | 5/2015 |
| (Continued) | | |

OTHER PUBLICATIONS

Samsung, "HARQ-ACK Transmission in Response to E-PDCCH Detection", R1-120193, 3GPP TSG RAN WG1 #68, Feb. 6, 2012.
(Continued)

*Primary Examiner* — Mark H Rinehart
*Assistant Examiner* — Sanjay K Dewan
(74) *Attorney, Agent, or Firm* — The Farrell Law Firm, P.C.

(57) ABSTRACT

Methods and apparatuses are provided for wireless communications. Configuration information including a resource start offset and information for a transmission type of an enhanced physical downlink control channel (EPDCCH) are transmitted. Downlink control information (DCI) is transmitted to a user equipment (UE) using at least one antenna port of a base station on the EPDCCH using at least one of control channel elements (CCEs). A resource of a physical uplink control channel (PUCCH) is determined based on a first CCE of the at least one of CCE, information in the DCI, and the resource start offset in the configuration information, if the transmission type of the EPDCCH is distributed transmission. A hybrid automatic repeat request acknowledgement (HARQ-ACK) signal is received on the determined resource.

18 Claims, 15 Drawing Sheets

Related U.S. Application Data

(60) Provisional application No. 61/606,772, filed on Mar. 5, 2012, provisional application No. 61/675,518, filed on Jul. 25, 2012, provisional application No. 61/684,997, filed on Aug. 20, 2012, provisional application No. 61/717,998, filed on Oct. 24, 2012.

(52) U.S. Cl.
CPC ......... *H04L 1/1896* (2013.01); *H04W 72/042* (2013.01); *H04W 72/0413* (2013.01)

(56) References Cited

U.S. PATENT DOCUMENTS

| | | | |
|---|---|---|---|
| 8,582,526 B2 | 11/2013 | Barghi et al. | |
| 8,867,469 B2 | 10/2014 | Han et al. | |
| 8,929,326 B2 | 1/2015 | Ahn et al. | |
| 8,958,379 B2* | 2/2015 | He | H04W 72/0413 370/329 |
| 8,995,364 B2* | 3/2015 | Kwon | H04L 1/0029 370/329 |
| 9,907,055 B2* | 2/2018 | Yang | H04W 72/0406 |
| 2010/0260116 A1* | 10/2010 | Imamura | H04W 72/082 370/329 |
| 2010/0316146 A1 | 12/2010 | McBeath et al. | |
| 2011/0070845 A1 | 3/2011 | Chen et al. | |
| 2011/0096745 A1 | 4/2011 | Ahn et al. | |
| 2011/0165906 A1 | 7/2011 | Papasakellariou et al. | |
| 2011/0228731 A1 | 9/2011 | Luo et al. | |
| 2011/0243066 A1* | 10/2011 | Nayeb Nazar | H04L 1/007 370/328 |
| 2011/0292902 A1* | 12/2011 | Yang | H04L 1/1614 370/329 |
| 2011/0305134 A1 | 12/2011 | Chung et al. | |
| 2011/0317653 A1* | 12/2011 | Kwon | H04L 1/1861 370/329 |
| 2012/0039285 A1* | 2/2012 | Seo | H04L 1/1671 370/329 |
| 2012/0083283 A1* | 4/2012 | Phan | H04W 72/048 455/450 |
| 2012/0113831 A1* | 5/2012 | Pelletier | H04L 5/0053 370/252 |
| 2012/0195292 A1* | 8/2012 | Ko | H04L 1/0027 370/336 |
| 2012/0320848 A1* | 12/2012 | Chen | H04W 28/06 370/329 |
| 2013/0039299 A1 | 2/2013 | Papasakellariou et al. | |
| 2013/0039307 A1 | 2/2013 | Han et al. | |
| 2013/0044722 A1 | 2/2013 | Kang et al. | |
| 2013/0094410 A1 | 4/2013 | Yang et al. | |
| 2013/0100866 A1 | 4/2013 | Yang et al. | |
| 2013/0107822 A1 | 5/2013 | Papasakellariou et al. | |
| 2013/0201926 A1 | 8/2013 | Nam et al. | |
| 2013/0215842 A1 | 8/2013 | Han et al. | |
| 2013/0223402 A1 | 8/2013 | Feng et al. | |
| 2013/0230017 A1 | 9/2013 | Papasakellariou et al. | |
| 2013/0230029 A1 | 9/2013 | Papasakellariou et al. | |
| 2013/0242770 A1 | 9/2013 | Chen et al. | |
| 2013/0242890 A1 | 9/2013 | He et al. | |
| 2014/0050140 A1 | 2/2014 | Fong et al. | |
| 2014/0071952 A1 | 3/2014 | Kim et al. | |
| 2014/0192757 A1 | 7/2014 | Lee et al. | |
| 2014/0219202 A1* | 8/2014 | Kim | H04L 1/1861 370/329 |
| 2014/0241298 A1* | 8/2014 | Park | H04L 5/001 370/329 |
| 2015/0016410 A1 | 1/2015 | Lee et al. | |
| 2015/0181588 A1* | 6/2015 | Song | H04L 1/1607 370/280 |
| 2015/0365207 A1* | 12/2015 | Lan | H04W 72/0426 370/329 |
| 2016/0112176 A1* | 4/2016 | Ahn | H04L 1/1607 370/329 |
| 2016/0119946 A1* | 4/2016 | Dai | H04L 1/00 370/329 |
| 2016/0135170 A1 | 5/2016 | Chen et al. | |

FOREIGN PATENT DOCUMENTS

| | | |
|---|---|---|
| WO | WO 2009/037854 | 3/2009 |
| WO | WO 2011/084038 | 7/2011 |
| WO | WO 2011/136523 | 11/2011 |
| WO | WO 2011/136584 | 11/2011 |
| WO | WO 2011/139027 | 11/2011 |

OTHER PUBLICATIONS

Alcatel-Lucent Shanghai Bell, "PUCCH Resource Mapping with ePDCCH", R1-114066, 3GPP TSG RAN WG1 Meeting #67, Nov. 14, 2011.
ASUSTeK, "PUCCH Resource Allocation Corresponding to ePDCCH", R1-120666, 3GPP TSG RAN WG1 Meeting #68, Feb. 6, 2012.
Pantech, "PUCCH Resource Allocation for E-PDCCH", R1-120329, 3GPP TSG RAN1 #68, Feb. 6, 2012.
LG Electronics, "Aspects on DL and UL Control Channels for HARQ with Enhanced PDCCH", R1-113921, Nov. 14, 2011.
U.S. Office Action dated Oct. 29, 2014 issued in counterpart U.S. Appl. No. 13/785,795.
Xian Yongju et al., Research on HARQ Process Mapping Mechanism Combined Carrier Aggregation, China Academic Journal, Communication and Network, Mar. 31, 2011, 5 pages.
Catt, "Remaining Issues on PUCCH Format 3", R1-105911, 3GPP TSG RAN WG1 Meeting #63, Nov. 15-19, 2010, 2 pages.
Chinese Office Action dated Jan. 4, 2017 issued in counterpart application No. 201380023585.2, 17 pages.
Japanese Office Action dated Feb. 27, 2017 issued in counterpart application No. 2014-560852, 6 pages.
Samsung, "PUCCH HARQ-ACK Resource Mapping for DL CA", R1-103637, 3GPP TSG RAN WG1 #61bis, Jun. 28-Jul. 2, 2010, 3 pages.
European Search Report dated Jul. 25, 2017 issued in counterpart application No. 13157866.8-1875, 11 pages.
U.S. Office Action dated May 22, 2018 issued in counterpart U.S. Appl. No. 14/878,682, 34 pages.
Panasonic, "Clarification of PUCCH Resource Allocation Related to EPDCCH SCells", R1-155359, 3GPP TSG-RAN1 #82bis, Oct. 5-9, 2015, 3 pages.
Japanese Office Action dated Aug. 27, 2018 issued in counterpart application No. 2017-212102, 4 pages.

* cited by examiner

1510 — HPRO: '00' → -2, '01' → -1, '10' → 0, '11' → 1

1520 — EPDCCH 1: DCI FORMAT INDICATES HPRO(1)

1530 — EPDCCH 2: DCI FORMAT INDICATES HPRO(2)

1540 — PUCCH RESOURCE $n_{PUCCH}(1) = n_{LCCE}(1) + HPRO(1) + N_{PUCCH}^{L}$

1550 — PUCCH RESOURCE $n_{PUCCH}(2) = n_{LCCE}(2) + HPRO(2) + N_{PUCCH}^{L}$

HARQ-ACK SIGNAL TRANSMISSION IN RESPONSE TO DETECTION OF CONTROL CHANNEL TYPE IN CASE OF MULTIPLE CONTROL CHANNEL TYPES

PRIORITY

The present application is a Continuation application of U.S. application Ser. No. 13/785,769, filed in the U.S. Patent and Trademark Office (USPTO) on Mar. 5, 2013, which claims priority under 35 U.S.C. § 119(e) to U.S. Provisional Application Nos. 61/606,772, 61/675,518, 61/684,997, and 61/717,998, which were filed in the USPTO on Mar. 5, 2012, Jul. 25, 2012, Aug. 20, 2012, and Oct. 24, 2012, respectively, the disclosures of which are incorporated herein by reference.

BACKGROUND OF THE INVENTION

1. Field of the Invention

The present invention relates generally to wireless communication systems and, more particularly, to the transmission and reception of ACKnowledgements (ACK) signals.

2. Description of the Art

A communication system includes a DownLink (DL) that conveys transmission signals from transmission points, such as, for example, Base Stations (BSs), or NodeBs, to User Equipments (UEs). The communication system also includes an UpLink (UL) that conveys transmission signals from UEs to reception points, such as, for example BSs or NodeBs. A UE, which is also commonly referred to as a terminal or a mobile station, may be fixed or mobile and may be embodied as a cellular phone, a personal computer device, etc. A NodeB is generally a fixed station and may also be referred to as an access point or some other equivalent terminology.

DL signals consist of data signals carrying information content, control signals carrying DL Control Information (DCI), and Reference Signals (RSs), which are also known as pilot signals. A NodeB transmits data information or DCI to UEs through a Physical DL Shared CHannel (PDSCH) or a Physical DL Control CHannel (PDCCH), respectively.

UL signals also consist of data signals, control signals and RSs. A UE transmits data information or UL Control Information (UCI) to a NodeB through a Physical Uplink Shared CHannel (PUSCH) or a Physical Uplink Control CHannel (PUCCH), respectively.

A NodeB transmits one or more of multiple types of RSs, including a UE-Common RS (CRS), a Channel State Information RS (CSI-RS), and a DeModulation RS (DMRS). The CRS is transmitted over substantially the entire DL system BandWidth (BW), and can be used by all UEs to demodulate data or control signals or to perform measurements. A UE can determine a number of NodeB antenna ports from which a CRS is transmitted through a broadcast channel transmitted from the NodeB. To reduce the overhead associated with the CRS, a NodeB may transmit a CSI-RS with a density in the time and/or frequency domain that is smaller than that of the CRS, for UEs to perform measurements. A UE can determine the CSI-RS transmission parameters through higher layer signaling from the NodeB. DMRS is transmitted only in the BW of a respective PDSCH, and a UE can use the DMRS to demodulate the information in the PDSCH.

A PDSCH transmission to a UE, or a PUSCH transmission from a UE, may be in response to dynamic scheduling or Semi-Persistent Scheduling (SPS). In dynamic scheduling, a NodeB conveys, to a UE, a DCI format through a respective PDCCH. The contents of a DCI format, and consequently its size, depend on the Transmission Mode (TM) for which a UE is configured for a respective PDSCH reception or PUSCH transmission. In SPS, a PDSCH or a PUSCH transmission is configured to a UE by a NodeB through higher layer signaling, such as, for example, Radio Resource Control (RRC) signaling. The transmission occurs at predetermined time instances and with predetermined parameters, as informed by the higher layer signaling.

FIG. 1 is a diagram illustrating a structure for a DL Transmission Time Interval (TTI).

Referring to FIG. 1, a DL TTI includes one subframe 110, which includes two slots 120 and a total of $N_{symb}^{DL}$ symbols for transmitting data information, DCI, or RS. Orthogonal Frequency Division Multiplexing (OFDM) is assumed for DL signal transmissions, and an OFDM symbol includes a Cyclic Prefix (CP). A first $M_{symb}^{DL}$ symbols are used to transmit DL CCHs 130. These $M_{symb}^{DL}$ symbols may be dynamically indicated in each DL TTI through a Physical Control Format Indicator CHannel (PCFICH) transmitted in a first subframe symbol. Remaining $M_{symb}^{DL}$-$M_{symb}^{DL}$ symbols are mainly used to transmit PDSCHs 140. A transmission BW consists of frequency resource units referred to as Resource Blocks (RBs). Each RB includes $N_{sc}^{RB}$ sub-carriers, or Resource Elements (REs). A unit of one RB in the frequency domain and one subframe in the time domain is referred to as a Physical Resource Block (PRB). A UE is allocated $M_{PDSCH}$ m RBs for a total of $M_{sc}^{PDSCH}=M_{PDSCH} \cdot N_{sc}^{RB}$ REs for a PDSCH transmission BW. Some REs in some symbols contain CRS 150 (or DMRS), which enable channel estimation and coherent demodulation of information signals at a UE.

Additional control channels may be transmitted in a DL control region. For example, assuming use of a Hybrid Automatic Repeat reQuest (HARQ) process for data transmission in a PUSCH, a NodeB may transmit HARQ-ACK information in a Physical Hybrid-HARQ Indicator CHannel (PHICH) to indicate to a UE whether its previous transmission of each data Transport Block (TB) in a PUSCH was correctly detected (i.e. through an ACK) or incorrectly detected (i.e. through a Negative ACK (NACK)).

FIG. 2 is a diagram illustrating an encoding process for a DCI format at a NodeB transmitter.

Referring to FIG. 2, a NodeB separately codes and transmits each DCI format in a respective PDCCH. A Cell or SPS Radio Network Temporary Identifier (C-RNTI or SPS-RNTI) for a UE, for which a DCI format is intended for, masks a Cyclic Redundancy Check (CRC) of a DCI format codeword in order to enable the UE to identify that a particular DCI format is intended for the UE. Alternatively, a DCI-type RNTI may mask a CRC if a DCI format provides UE-common information. A CRC computation unit 220 computes the CRC of (non-coded) DCI format bits 210. The CRC is then masked using an exclusive OR (XOR) operation 230 between the CRC and respective RNTI bits 240. The XOR operation 230 is defined as: XOR(0,0)=0, XOR (0,1)=1, XOR(1,0)=1, XOR(1,1)=0. For example, both a CRC and an RNTI consist of 16 bits. The masked CRC bits are appended to DCI format information bits using a CRC append operation at an append CRC unit 250. Channel coding is performed using a channel coding operation at a channel coding unit 260 (for example, using a convolutional code). A rate matching operation is performed to allocated resources at a rate matching unit 270. Interleaving and modulation are performed at an interleaving and modulation unit 280 for transmission of a control signal 290.

FIG. 3 is a diagram illustrating a decoding process for a DCI format at a UE receiver.

Referring to FIG. 3, a UE receiver demodulates a received control signal 310 and resulting bits are de-interleaved at a demodulation and de-interleaving unit 320. A rate matching applied at a NodeB transmitter is restored through a rate matching unit 330. Data is subsequently decoded at a channel decoder 340. After decoding the data, DCI format information bits 360 are obtained after extracting CRC bits at a CRC extraction unit 350. The CRC bits are de-masked by applying an XOR operation 370 with a respective UE RNTI mask 380. A UE performs a CRC test in a CRC test unit 390. If the CRC test passes, a UE considers the DCI format as valid and determines parameters for signal reception or signal transmission. If the CRC test does not pass, a UE disregards the presumed DCI format.

To avoid a PDCCH transmission to a UE that is blocking a PDCCH transmission to another UE, a location of each PDCCH in the time-frequency domain of a DL control region is not unique. Therefore, a UE needs to perform multiple decoding operations to determine whether there are PDCCHs intended for the UE in a DL subframe. The REs carrying a PDCCH are grouped into Control Channel Elements (CCEs) in the logical domain. For a given number of DCI format bits in FIG. 2, a number of CCEs for a respective PDCCH depends on a channel coding rate (Quadrature Phase Shift Keying (QPSK) is assumed as the modulation scheme). A NodeB may use a lower channel coding rate (i.e., more CCEs) for transmitting PDCCHs to UEs experiencing a low DL Signal-to-Interference and Noise Ratio (SINR) than to UEs experiencing a high DL SINR. The CCE aggregation levels may include, for example, of $L_C \in \{1,2,4,8\}$ CCEs.

For a PDCCH decoding process, a UE may determine a search space for candidate PDCCHs after the UE restores the CCEs in the logical domain, according to a common set of CCEs for all UEs (i.e., a Common Search Space (CSS)) and according to a UE-dedicated set of CCEs (i.e., a UE-Dedicated Search Space (UE-DSS)). A CSS may include the first C CCEs in the logical domain. A UE-DSS may be determined according to a pseudo-random function having UE-common parameters as inputs, such as, for example, the subframe number or the total number of CCEs in the subframe, and UE-specific parameters such as the RNTI. For example, for CCE aggregation levels $L_C \in \{1,2,4,8\}$, the CCEs corresponding to PDCCH candidate m are provided by Equation (1).

$$\text{CCEs for PDCCH candidate } m = L \cdot \{(Y_k + m) \bmod \lfloor N_{CCE,k}/L \rfloor\} + i \quad (1)$$

In Equation (1), $N_{CCE,k}$ is a total number of CCEs in subframe k, $i=0, \ldots, L_C-1$, $m=0, \ldots, M_C^{(L_C)}-1$, and $M_C^{(L_C)}$ is a number of PDCCH candidates to monitor in a search space. For example, for $L_C \in \{1,2,4,8\}$, $M_C^{(L_C)} = \{6,6,2,2\}$, respectively. For the CSS, $Y_k = 0$. For the UE-DSS, $Y_k = (A \cdot Y_{k-1}) \bmod D$ where $Y_{-1} = \text{RNTI} \neq 0$, $A=39827$ and $D=65537$.

DCI formats conveying information to multiple UEs are transmitted in a CSS. Additionally, if enough CCEs remain after the transmission of DCI formats conveying information to multiple UEs, a CSS may also convey some UE-specific DCI formats for DL SAs or UL SAs. A UE-DSS exclusively conveys UE-specific DCI formats for DL SAs or UL SAs. For example, a UE-CSS may include 16 CCEs and support 2 DCI formats with L=8 CCEs, 4 DCI formats with L=4 CCEs, or 1 DCI format with L=8 CCEs and 2 DCI formats with L=4 CCEs. The CCEs for a CSS are placed first in the logical domain (prior to interleaving).

FIG. 4 is a diagram illustrating a transmission process of DCI formats in respective PDCCHs.

Referring to FIG. 4, encoded DCI format bits are mapped to PDCCH CCEs in the logical domain. The first 4 CCEs (L=4), CCE1 401, CCE2 402, CCE3 403, and CCE4 404 are used to transmit a PDCCH to UE1. The next 2 CCEs (L=2), CCE5 411 and CCE6 412, are used to transmit a PDCCH to UE2. The next 2 CCEs (L=2), CCE7 421 and CCE8 422, are used to transmit a PDCCH to UE3. Finally, the last CCE (L=1), CCE9 431, is used to transmit a PDCCH to UE4. The DCI format bits may be scrambled by a binary scrambling code, in step 440, and are subsequently modulated, in step 450. Each CCE is further divided into Resource Element Groups (REGs). For example, a CCE consisting of 36 REs can be divided into 9 REGs, each consisting of 4 REs. Interleaving is applied among REGs (blocks of 4 QPSK symbols), in step 460. For example, a block interleaver may be used. The resulting series of QPSK symbols may be shifted by J symbols, in step 470. Each QPSK symbol is mapped to an RE in the control region of the DL subframe, in step 480. Therefore, in addition to a CRS, 491 and 492, and other control channels such as a PCFICH 493 and the PHICH, the REs in the PDCCH contain QPSK symbols corresponding to a DCI format for UE1 494, UE2 495, UE3 496, and UE4 497.

A UE may transmit a HARQ-ACK signal in a PUCCH in response to detecting a PDCCH associated with a PDSCH, and may implicitly derive a respective PUCCH resource $n_{PUCCH}$ from the first CCE, $n_{CCE}$ of a respective PDCCH as set forth in Equation (2).

$$n_{PUCCH} = n_{CCE} + N_{PUCCH} \quad (2)$$

where $N_{PUCCH}$ is an offset the NodeB informed to UEs through higher layer signaling.

For a UL system BW consisting of $N_{RB}^{max,UL}$ RBs, where each RB consists of $N_{sc}^{RB} = 12$ REs, a Zadoff-Chu (ZC) sequence $r_{u,v}^{(\alpha)}(n)$ can be defined by a Cyclic Shift (CS) $\alpha$ of a base ZC sequence $\bar{r}_{u,v}(n)$ according to $r_{u,v}^{(\alpha)}(n) = e^{j\alpha n}\bar{r}_{u,v}(n)$, $0 \le n < M_{sc}^{RS}$, where $M_{sc}^{RS} = mN_{sc}^{RB}$ is the length of the ZC sequence, $1 \le m \le N_{RB}^{max,UL}$, and $\bar{r}_{u,v}(n) = x_q(n \bmod N_{ZC}^{RS})$ where the $q^{th}$ root ZC sequence is defined by $$x_q(m) = \exp\left(\frac{-j\pi qm(m+1)}{N_{ZC}^{RS}}\right),$$

$0 \le m \le N_{ZC}^{RS}-1$ with q given by $q = \lfloor \bar{q}+\frac{1}{2} \rfloor + v \cdot (-1)^{\lfloor 2\bar{q} \rfloor}$ and $\bar{q}$ given by $\bar{q} = N_{ZC}^{RS} \cdot (u+1)/31$. A length $N_{ZC}^{RS}$ of a ZC sequence is given by the largest prime number such that $N_{ZC}^{RS} < M_{sc}^{RS}$. Multiple RS sequences can be defined from a single base sequence through different values of $\alpha$. A PUCCH transmission is assumed to be in one RB ($M_{sc}^{RS} = N_{sc}^{RB}$).

FIG. 5 is a block diagram illustrating a UE transmitter for a ZC sequence.

Referring to FIG. 5, a sub-carrier mapping unit 520 maps a ZC sequence from a ZC sequence unit 510 to REs of an assigned transmission BW as they are indicated by RE selection unit 525. Subsequently, an IFFT is performed by an IFFT unit 530, a CS is applied to the output by a CS unit 540, followed by scrambling with a cell-specific sequence using a scrambling unit 550. A CP is inserted by a CP insertion unit 560, and the resulting signal is filtered by a time windowing unit 570. The transmission power $P_{PUCCH}$ is applied by a power amplifier 580, and a ZC sequence 590 is transmitted. Without modulation, a ZC sequence serves as an RS. With modulation, a ZC sequence serves as a HARQ-ACK signal.

The DL control region in FIG. 1 uses a maximum of $M_{symb}^{DL}=3$ OFDM symbols and transmits a control signal substantially over a total DL BW. This configuration limits PDCCH capacity and cannot achieve interference coordination in the frequency domain among PDCCH transmissions from different NodeBs. There are several cases where expanded PDCCH capacity or PDCCH interference coordination in the frequency domain is needed for transmission of control signals. One such case is use of spatial multiplexing for PDSCH transmissions where multiple PDCCHs schedule same PDSCH resources to multiple UEs and expanded PDCCH capacity is needed. Another case is for heterogeneous networks where DL transmissions in a first cell experience strong interference from DL transmissions in a second cell, and interference coordination in the frequency domain between the two cells is needed.

A direct extension of the maximum DL control region size to more than $M_{symb}^{DL}=3$ OFDM symbols is not possible at least due to the requirement to support legacy UEs, which cannot be aware of such an extension. An alternative is to support DL control signaling in the conventional PDSCH region by using individual PRBs. A PDCCH transmitted in PRBs of the conventional PDSCH region are referred to as Enhanced PDCCH (EPDCCH).

FIG. 6 is a diagram illustrating EPDCCH transmissions in a DL subframe.

Referring to FIG. 6, although EPDCCH transmissions start immediately after a conventional DL control channel 610 and are transmitted over all remaining DL subframe symbols, EPDCCH transmissions may instead start at a predetermined subframe symbol and extend over a part of remaining DL subframe symbols. EPDCCH transmissions may occur in four PRBs, 620, 630, 640, and 650, while remaining PRBs 660, 662, 664, 666, and 668 may be used for PDSCH transmissions. As an EPDCCH transmission over a given number of subframe symbols may require fewer REs than the number of subframe symbols available in a PRB, multiple EPDCCHs may be multiplexed in a same PRB. The multiplexing can be in any combination of possible domains (i.e., time domain, frequency domain, or spatial domain) and, in a manner similar to a PDCCH, an EPDCCH includes at least one Enhanced CCE (ECCE). Similar extensions may apply to PCFICH transmission (EPCFICH) or to PHICH transmission (EPHICH).

A UE can be configured by higher layer signaling the PRBs for potential transmissions of Enhanced CCHs (ECCHs), which can include, for example, EPDCCHs, EPCFICH, or EPHICHs. An ECCH transmission to a UE over a number of DL subframe symbols may be in a single PRB, if a NodeB has accurate DL channel information for the UE and can perform Frequency Domain Scheduling (FDS) or beam-forming, or it may be in multiple PRBs if accurate DL channel information is not available or if an ECCH is intended for multiple UEs. An ECCH transmission over a single PRB is referred to as localized or non-interleaved. An ECCH transmission over multiple PRBs is referred to as distributed or interleaved.

An exact design of a search space for EPDCCH candidates is not material to embodiments of the present invention and may be assumed to follow the same principles as a search space design for PDCCH candidates. Therefore, a number of EPDCCH candidates can exist for each possible ECCE aggregation level $L_E$ where, for example, $L_E \in \{1,2,4\}$ ECCEs for localized EPDCCH and $L_E \in \{1,2,4,8\}$ ECCEs for distributed EPDCCH. A UE determines EPDCCH candidates for each ECCE aggregation level in a search space according to predetermined functions similar to the one previously described for determining CPDCCH candidates for each CCE aggregation level.

FIG. 7 is a diagram illustrating an allocation of ECCEs for localized EPDCCH transmissions.

Referring to FIG. 7, the partitioning of ECCEs is in the frequency domain, a FRB contains 4 ECCEs, 710, 720, 730, and 740, and an EPDCCH transmission to a UE may consist of 1, 2, or 4 ECCEs. There are four orthogonal DMRS antenna ports using Code Division Multiplexing (CDM) and Frequency Division Multiplexing (FDM). DMRS port 1 750 and DMRS port 2 760 occupy the same REs and are separate through the use of the Orthogonal Covering Codes (OCCs) {1, 1} and {1, −1}, respectively, over two successive subframe symbols. The same applies for DMRS port 3 770 and DMRS port 4 780, which occupy different REs than the first two DMRS ports. A DMRS transmission from each antenna port may also be scrambled with a scrambling sequence. For localized EPDCCH, a UE is assigned a unique DMRS port, based for example on its identity (C-RNTI) or the subframe number, or the DMRS antenna port for a UE may also depend on the ECCE number or the EPDCCH candidate. An EPDCCH transmission is assumed to start, for example, in a first subframe symbol after legacy CCHs 790, if any, and extend in the remaining subframe symbols.

To improve the spectral efficiency of EPDCCH transmissions and therefore reduce the associated overhead and increase the DL throughout, EPDCCHs to different UEs may be transmitted using spatial multiplexing. This is enabled by the NodeB opportunistically using the same resources for multiple EPDCCH transmissions to respectively multiple UEs by applying a different precoding to each EPDCCH transmission so that it becomes substantially orthogonal to the remaining EPDCCH transmissions, thereby substantially suppressing the mutual interference. In enabling spatial multiplexing, it is essential to provide orthogonal DMRS to each UE so that a respective channel estimate can be accurately obtained and orthogonal projections to the remaining EPDCCH transmissions can be made. In this manner, and as the DMRS conveyed by each EPDCCH has the same precoding as the respective data, the use of spatial multiplexing is transparent to a UE.

FIG. 8 is a diagram illustrating a transmission of two EPDCCHs through spatial multiplexing using same ECCEs.

Referring to FIG. 8, a first EPDCCH transmission associated with DMRS port 1 810 and a second EPDCCH transmission associated with DMRS port 2 820 are multiplexed in REs corresponding to the same ECCEs #0 and #1 830. DMRS port 3 860 and DMRS port 4 870 may or may not exist. In the latter case, the respective REs may be used for EPDCCH transmission (or may remain empty). Also, although the spatially multiplexed EPDCCH transmissions are shown to be transmitted over the same number of ECCEs, they may instead be transmitted over a different number of ECCEs and partially overlap. Similar to the DMRS, the control information in a DCI format can be scrambled by a scrambling sequence.

The use of spatial multiplexing for transmissions of EPDCCHs associated with PDSCHs to respective UEs results in PUCCH resource collision for respective HARQ-ACK signal transmissions under the conventional PUCCH resource determination. Denoting the first EPDCCH ECCE as $n_{ECCE}$ the PUCCH resource for HARQ-ACK signal transmission is $n_{PUCCH}^E = n_{ECCE} + N_{PUCCH}^E$, where $N_{PUCCH}^E$ is an offset a NodeB informed to UEs through higher layer signaling. $N_{PUCCH}^E$ may be the same as $N_{PUCCH}$ or it may be separately configured for EPDCCH operation. When $n_{ECCE}$ is the same for UEs with spatially multiplexed EPDCCH transmissions associated with respective PDSCHs, the PUCCH resource for each respective HARQ-ACK signal transmission is the same.

The previous PUCCH resource collision problem is further exacerbated when a UE is configured antenna transmission diversity for HARQ-ACK signal transmissions and a different PUCCH resource is required for each antenna. For two antennas, a conventional method is to obtain a PUCCH resource for the first antenna as for the case of a single antenna, $n_{PUCCH}=n_{ECCE}+N_{PUCCH}$, and obtain a PUCCH resource for the second antenna as $n_{PUCCH}=n_{ECCE}+1+N_{PUCCH}$. Due to the limited number of ECCEs per PRB, such as 4 ECCEs per PRB, the PUCCH resource collision problem for transmitter antenna diversity exists regardless of the use of spatial multiplexing for EPDCCH transmissions.

Regardless of whether spatial multiplexing is used for EPDCCH transmissions or transmitter antenna diversity is used for HARQ-ACK signal transmissions in response to an EPDCCH detection associated with a PDSCH, the channelization of respective PUCCH resources needs to be defined. These PUCCH resources in response to detections of EPDCCHs and in response to detections of PDCCHs can be shared or separate. Moreover, these PUCCH resources in response to detections of distributed EPDCCHs and in response to detections of localized EPDCCHs can be also shared or separate. In general, separate PUCCH resources increase UL overhead since the number of PDSCHs per subframe does not significantly vary regardless of whether the scheduling is only by PDCCHs, only by EPDCCHs, or by both.

In case a PUCCH resource $n_{PUCCH}$ in response to an EPDCCH detection associated with a PDSCH, is implicitly derived as a function of the first ECCE $n_{ECCE}$ and a $N_{PUCCH}^E$ parameter configured by higher layer signaling, $n_{PUCCH}^E=f(n_{ECCE})=n_{ECCE}+N_{PUCCH}^E$, collisions among PUCCH resources used in response to PDCCH and EPDCCH detections by different UEs can be avoided by either one of the following approaches:
a) The values of $N_{PUCCH}$ and $N_{PUCCH}^E$ are such that different PUCCH resources are always used for HARQ-ACK signal transmissions corresponding to PDCCH and EPDCCH detections, respectively.
b) A UE decodes a PCFICH and determines a total number of PDCCH CCEs (by determining a number of DL subframe symbols used to transmit legacy DL control region and knowing a number of CRS REs and PHICH/PCFICH REs). PUCCH resources corresponding to EPDCCH detections can then be sequentially numbered after the ones corresponding to PDCCH detections.
c) A shared set of PUCCH resources is used and the NodeB scheduler is restricted in using the first CCE for a PDCCH transmission or the first ECCE for an EPDCCH transmission so that the respective HARQ-ACK signal transmissions do not use same PUCCH resources.

The first two approaches increase PUCCH overhead compared to using only PDCCHs for scheduling PDSCHs even though an average number of such PDSCHs per subframe may not be larger than when both PDCCHs and EPDCCHs are used. The first approach results in a larger increase in PUCCH overhead as, if a UE does not read the PCFICH, it may need to assume the largest number of CCEs for PDCCH transmissions. The third approach may avoid increasing the PUCCH overhead but may place significant restrictions on the scheduler operation, which may not be feasible in practice.

Therefore, there is a need to define PUCCH resources for HARQ-ACK signal transmissions in response to detections of PDCCHs, distributed EPDCCHs, and localized EPDCCHs associated with respective PDSCHs, while minimizing the associated overhead and avoiding using the same PUCCH resource for multiple HARQ-ACK signal transmissions.

There is also a need to allocate different PUCCH resources for HARQ-ACK signal transmissions from different UEs in response to respective EPDCCH detections associated with respective PDSCHs and sharing a same first ECCE.

There is a further need to enable antenna diversity for the transmission of a HARQ-ACK signal in response to an EPDCCH detection associated with a PDSCH.

SUMMARY OF THE INVENTION

The present invention has been made to address at least the above problems and/or disadvantages and to provide at least the advantages described below. Accordingly, an aspect of the present invention provides methods and apparatus for a UE to transmit and for a base station (NodeB) to receive a HARQ-ACK signal in a resource of a PUCCH.

In accordance with an embodiment of the present invention, a method is provided for wireless communications. Configuration information including a resource start offset and information for a transmission type of an EPDCCH are transmitted. DCI is transmitted to a UE using at least one antenna port of a base station on the EPDCCH using at least one of CCEs. A resource of a PUCCH is determined based on a first CCE of the at least one of CCE, information in the DCI, and the resource start offset in the configuration information, if the transmission type of the EPDCCH is distributed transmission. A HARQ-ACK signal is received on the determined resource.

In accordance with another embodiment of the present invention, an apparatus of a base station is provided for wireless communications. The apparatus includes a transmitter configured to transmit configuration information including a resource start offset and information for a transmission type of an EPDCCH, and transmit, to a UE, DCI using at least one antenna port of the base station on the EPDCCH using at least one of CCEs. The apparatus also includes a processor configured to determine a resource of a PUCCH based on a first CCE of the at least one of CCEs, information in the DCI, and the resource start offset in the configuration information, if the transmission type of the EPDCCH is configured for distributed transmission. The apparatus further includes a receiver configured to receive a HARQ-ACK signal on the determined resource.

BRIEF DESCRIPTION OF THE DRAWINGS

The above and other aspects, features, and advantages of the present invention will be more apparent from the following detailed description when taken in conjunction with the accompanying drawings, in which.

Figure 1:
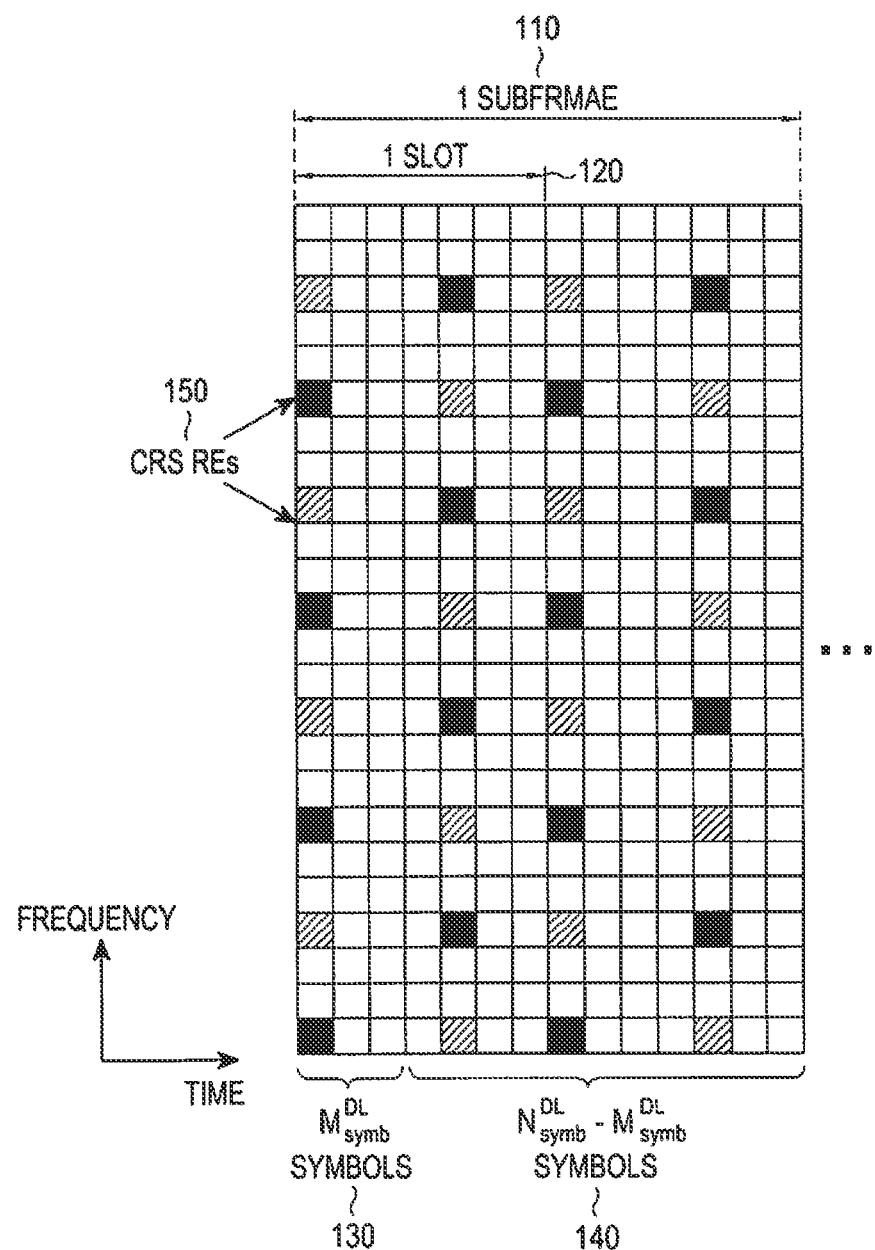
FIG. 1 is a diagram illustrating a structure for a DL TTI.
Figure 2:
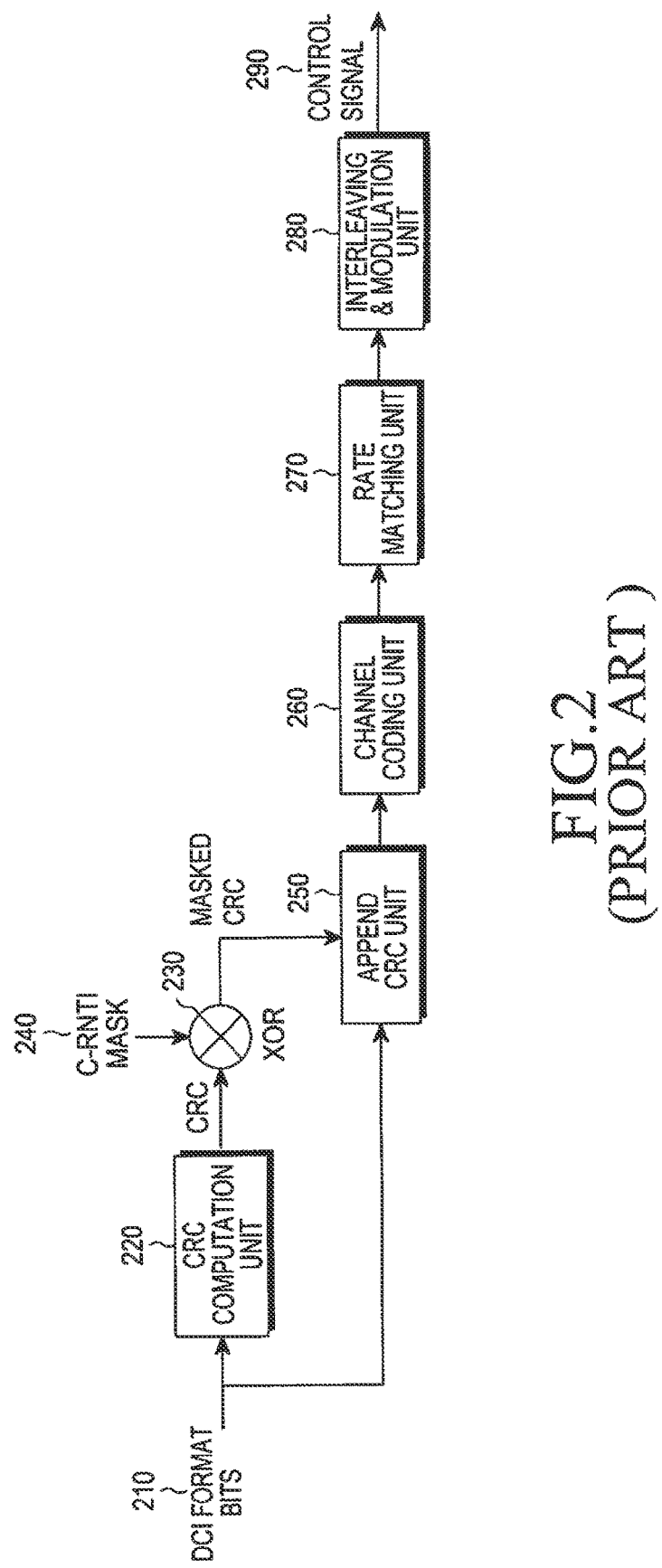
FIG. 2 is a diagram illustrating an encoding process for a DCI format at a NodeB transmitter.
Figure 3:
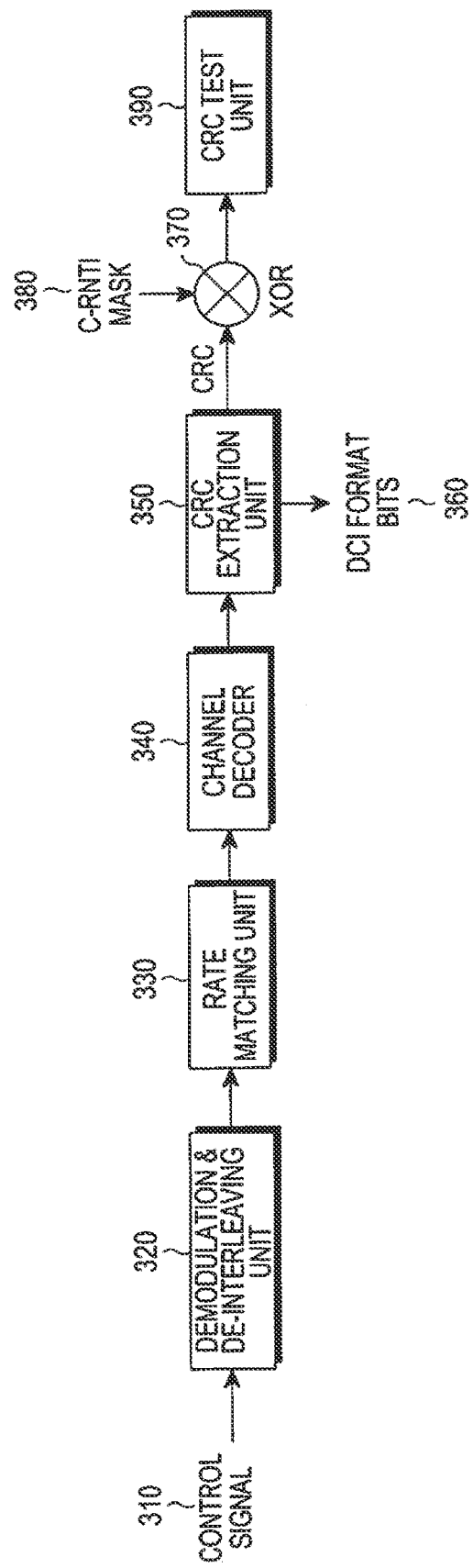
FIG. 3 is a diagram illustrating a decoding process for a DCI format at a UE receiver.

DETAILED DESCRIPTION OF EMBODIMENTS
OF THE PRESENT INVENTION

Embodiments of the present invention are described in detail with reference to the accompanying drawings. The same or similar components may be designated by the same or similar reference numerals although they are illustrated in different drawings. Further, various specific definitions found in the following description are provided only to help a general understanding of the present invention, and it is apparent to those skilled in the art that the present invention can be implemented without such definitions. Detailed descriptions of constructions or processes known in the art may be omitted to avoid obscuring the subject matter of the present invention.

Additionally, although the embodiments of the present invention are described below with reference to OFDM and Discrete Fourier Transform Spread OFDM (DFT-S-OFDM), they also are applicable to all Frequency Division Multiplexing (FDM) transmissions in general.

A first embodiment of the present invention considers methods for multiplexing PUCCH resources in response to detections of PDCCHs and EPDCCHs associated with respective PDSCHs. The first embodiment of the invention also considers a UE apparatus for determining a PUCCH resource for a HARQ-ACK signal transmission in response to a detection of an EPDCCH associated with a PDSCH, and for determining whether a PRB is used to transmit EPDCCH or PDSCH in a subframe.

In the following description, an ECCE is categorized as a DCCE if it is allocated to a distributed EPDCCH, and is categorized as an LCCE if it is allocated to a localized EPDCCH. A DCCE may or may not have the same size as an LCCE. Moreover, unless explicitly mentioned, for the embodiments of the present invention an EPDCCH transmission is assumed to always be associated with a respective PDSCH transmission or a release of an SPS PDSCH transmission.

In a first approach, a UE is configured by a NodeB through higher layer signaling a set of PRBs that can be potentially used to transmit EPDCCHs in a subframe to any UE communicating with the NodeB. Different PRBs can also be used to transmit distributed EPDCCHs and localized EPDCCHs, and a UE can be configured with a separate set of PRBs for each EPDCCH transmission type in a subframe. A UE is also configured a subset of PRBs that can be potentially be used to transmit EPDCCHs to that UE in a subframe (UE-specific set of PRBs). If different PRBs are used to transmit distributed EPDCCHs and localized EPDCCHs, this subset of PRBs can be further be divided into two respective subsets that are individually configured to a UE (from the NodeB by higher layer signaling). For brevity, the following analysis considers localized EPDCCHs, however, the same process applies for distributed EPDCCHs.

Assuming a fixed number of LCCEs per PRB, a configuration of a set or a subset of PRBs for transmitting localized EPDCCHs is equivalent to a configuration of a set or a subset, respectively, of LCCEs per subframe. LCCEs in the set of PRBs are sequentially numbered and a UE determines a PUCCH resource for HARQ-ACK transmission in response to an EPDCCH detection based on the respective LCCE number in the set of LCCEs, and not based on the respective LCCE number in the subset of LCCEs, or the respective LCCE number in the PRB of the localized EPDCCH transmission. Different subsets of PRBs can be configured to UEs, and the whole set of PRBs may be configured to any UE, including all UEs, for potential localized EPDCCH transmissions.

Figure 7:
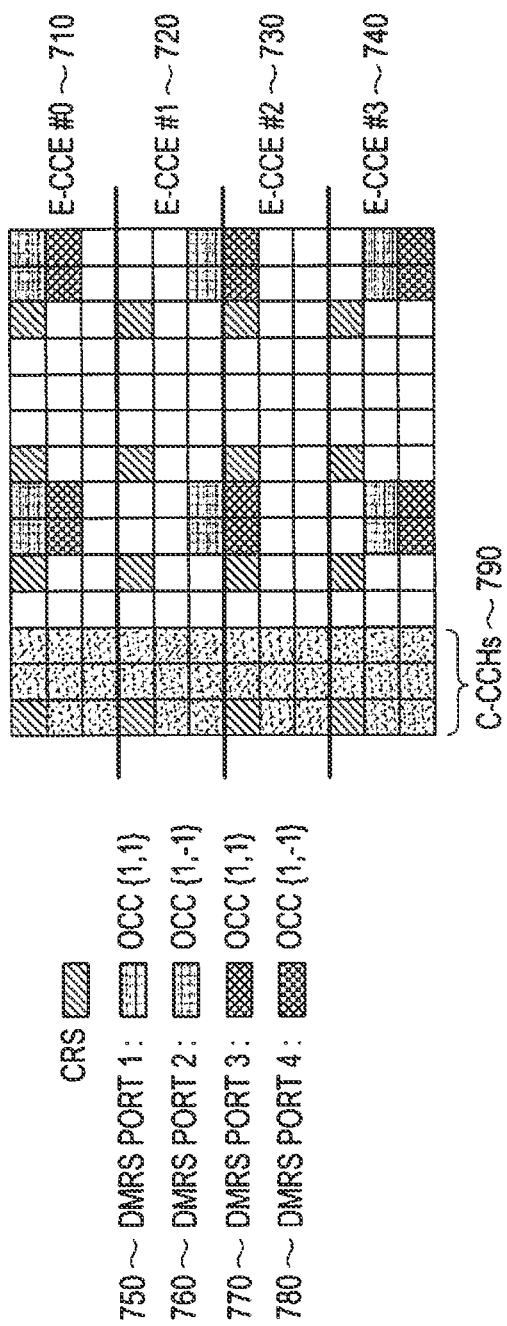
FIG. 7 is a diagram illustrating an allocation of ECCEs for localized EPDCCH transmissions.
Figure 8:
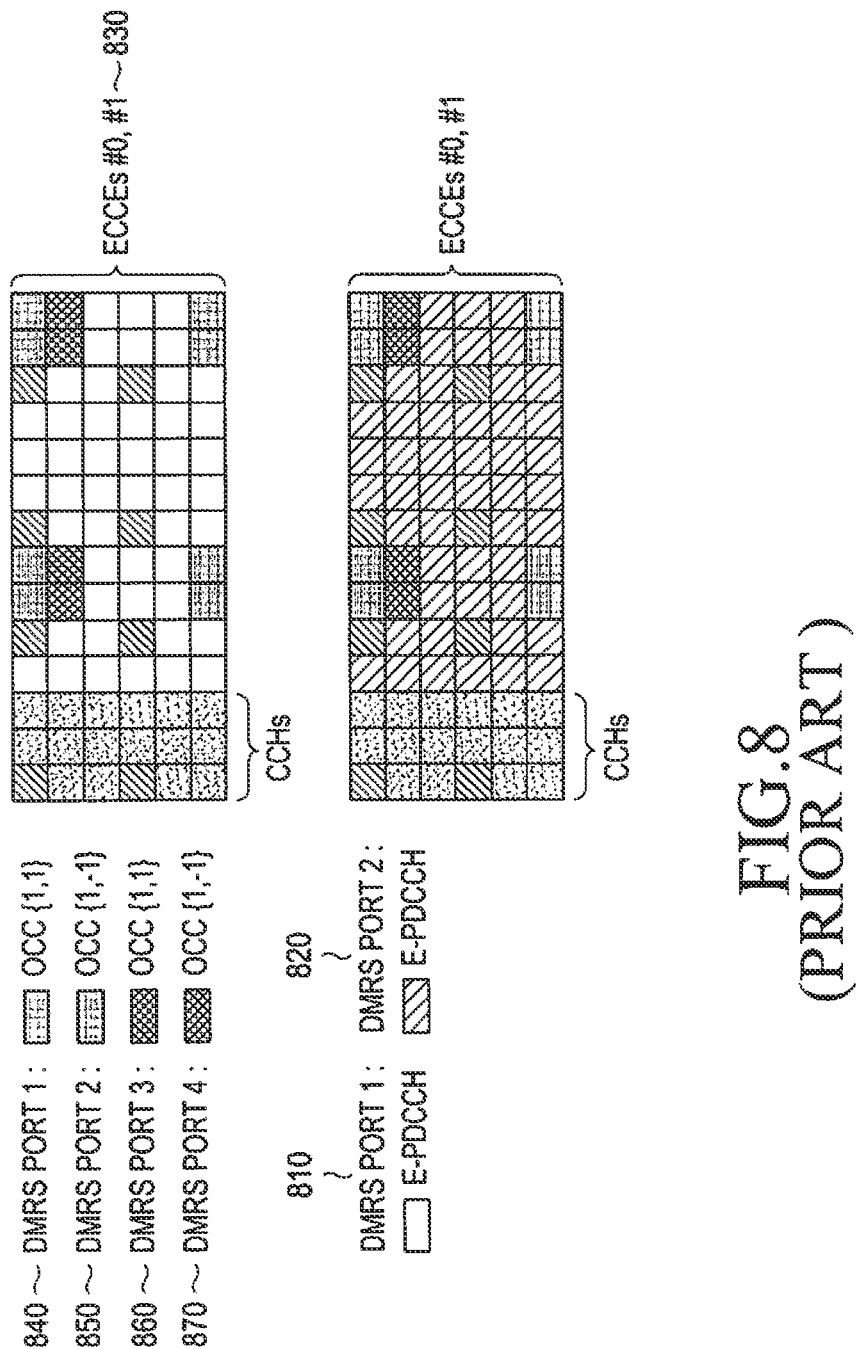
FIG. 8 is a diagram illustrating a transmission of two EPDCCHs through spatial multiplexing using same ECCEs.

One reason for configuring different sets of PRBs for localized EPDCCH transmissions to UEs is to provide interference co-ordination in the frequency domain in some sets of PRBs for benefiting UEs, such as, for example, cell-edge UEs, but not in other sets of PRBs for non-benefiting UEs, such as, for example, cell interior UEs, in order to simplify planning and avoid excessive DL BW fragmentation that may impact PDSCH scheduling, especially to legacy UEs. Another reason for configuring different sets of PRBs to UEs for localized EPDCCH transmissions is for allowing EPDCCHs to be transmitted from different points in different sets of PRBs in accordance with a Coordinated Multi-Point (COMP) transmission principle. A single subset of PRBs is configured to a UE for potential EPDCCH transmissions, and different scrambling, as described in FIG. 7 or FIG. 8, may be used in different subsets of PRBs (same scrambling is used in a single subset of PRBs).

The US-DSS for localized EPDCCH transmissions is limited over a respective configured subset of PRBs and may be based on a similar design as the legacy UE-DSS (for example, as in Equation (1)) with a restriction that each candidate is contained in a single PRB. A UE may consider that the LCCEs are serially numbered across the configured subset of PRBs, and the LCCEs in the remaining PRBs in the configured set of PRBs are not considered for determining the UE-DSS. However, for determining a PUCCH resource for a HARQ-ACK signal transmission, a UE may consider all LCCEs in the configured set of PRBs. This ensures that although LCCEs with the same number, with respect to the respective UE-DSSs, are used for localized EPDCCH transmissions to respective UEs having different respective configured subsets of PRBs, different PUCCH resources are used for the respective HARQ-ACK signal transmissions.

Figure 9:
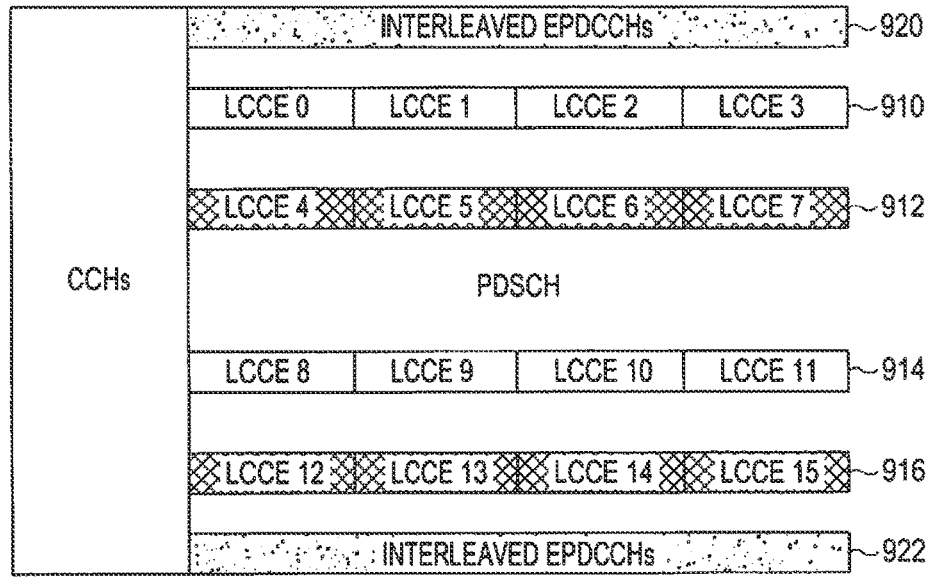
FIG. 9 is a diagram illustrating an implicit PUCCH resource determination for HARQ-ACK transmission in response to a localized EPDCCH detection by a UE.
Figure 9:
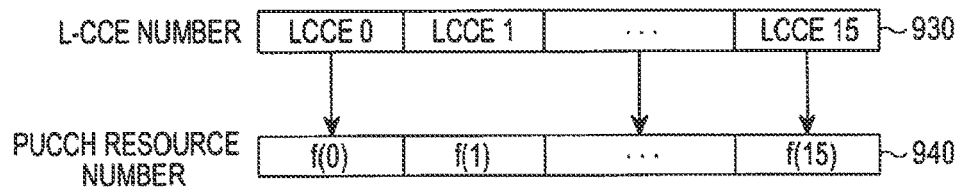

FIG. 9 is a diagram illustrating an implicit PUCCH resource determination for HARQ-ACK transmission in response to a localized EPDCCH detection by a UE.

Referring to FIG. 9, a set of PRBs is configured to a UE for potential localized EPDCCH transmissions either to the reference UE or to any other UE 910, 912, 914, and 916. From this set of PRBs, a subset of PRBs 910 and 914 is configured to the UE for localized EPDCCH transmissions to itself. A subset of PRBs may also be configured to the UE for potential distributed EPDCCH transmissions 920 and 922. The number of LCCEs per PRB is 4. For determining a PUCCH resource for a HARQ-ACK signal transmission in response to an EPDCCH detection, a UE sequentially considers all LCCEs in the configured set of PRBs 930 for a total of 16 LCCEs, even though only the LCCEs in PRBs 910 and 914 constitute the UE-DSS for localized EPDCCHs. An implicit mapping for a PUCCH resource 940, as set forth in Equation (3).

$$n_{PUCCH}^L = f(n_{LCCE}) = n_{LCCE} + N_{PUCCH}^L, \quad (3)$$

where $N_{PUCCH}^L$ is an offset for localized EPDCCH transmissions and it is configured to the UE through higher layer signaling and may be different for different sets of PRBs. However, as it is subsequently described, the mapping can be augmented with an explicit component. Moreover, a $N_{PUCCH}^D$ offset for PUCCH resource determination is also configured to the UE for HARQ-ACK signal transmission in response to detections of distributed EPDCCHs. $N_{PUCCH}^L$ may be the same as $N_{PUCCH}^D$, or it may be the same as the legacy $N_{PUCCH}$.

A UE may also be informed only of sets of PRBs that may be used in a subframe for EPDCCH transmissions, and may not be aware of other possible sets of PRBs used for EPDCCH transmissions to some other UEs. A UE may only know of an index for a DCCE or for an LCCE in respective sets of PRBs it is aware of, such as, for example, PRBs 910 and 914, as being used for respective EPDCCH transmissions in a subframe. For LCCEs, an indexing can be as illustrated in FIG. 9 but limited only in sets of PRBs known to a UE (for example, in ascending PRB order, LCCEs in PRB 910 are indexed first from 0 to 3, and LCCEs in PRB 914 are indexed second from 4 to 7, instead of from 8 to 11). A first UE for which a first set of UE-specific PRBs is used to transmit EPDCCH in a subframe and a second UE for which a second set of UE-specific PRBs is used to transmit EPDCCH in a subframe may use, at least partially, the same DCCE or LCCE indexes in deriving a PUCCH resource for an HARQ-ACK signal transmission in response to a respective distributed or localized EPDCCH detection. Consequently, without scheduling restrictions that are typically undesirable, a same PUCCH resource may be derived by multiple UEs for transmitting respective multiple HARQ-ACK signals in response to respective multiple EPDCCH detections, leading to collisions and unreliable reception of respective HARQ-ACK signals. Such collisions can again be avoided through the use of a UE-specific offset $N_{PUCCH}^D$ or $N_{PUCCH}^L$, which can control or eliminate the overlap of PUCCH resources corresponding to different sets of PRBs configured for EPDCCH transmissions to different UEs.

Figure 10:
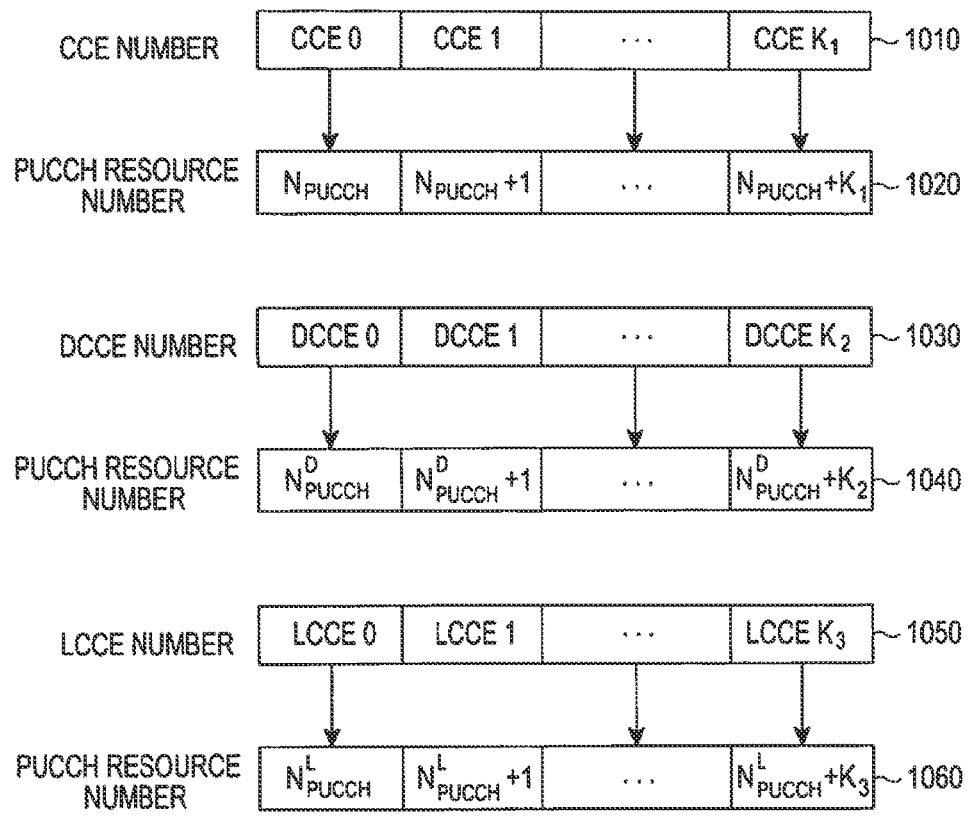
FIG. 10 is a diagram illustrating a process for UEs to determine PUCCH resources for transmissions of HARQ-ACK signals in response to detecting respective PDCCHs, distributed EPDCCHs, or localized EPDCCHs, according to an embodiment of the present invention.

FIG. 10 is a diagram illustrating a process for UEs to determine PUCCH resources for transmissions of HARQ-ACK signals in response to detecting respective PDCCHs, distributed EPDCCHs, or localized EPDCCHs, according to an embodiment of the present invention.

Referring to FIG. 10, for PDCCH CCE k and a total of $K_1$ CCEs 1010, the respective PUCCH resource for HARQ-ACK signal transmission is determined as $N_{PUCCH}+k$ 1020. For distributed EPDCCH DCCE k and a total of $K_2$ DCCEs 1030, the respective PUCCH resource for HARQ-ACK signal transmission is determined as $N_{PUCCH}^D+k$ 1040. For localized EPDCCH LCCE k and a total of $K_3$ LCCEs 1050, the respective PUCCH resource for HARQ-ACK signal transmission is determined as $N_{PUCCH}^L+k$ 1060.

By controlling the values of $N_{PUCCH}$, $N_{PUCCH}^D$ and $N_{PUCCH}^L$, a NodeB can allow for full overlap of the respective PUCCH resources to minimize the associated overhead, allow for partial overlap, or allow for their full separation to avoid any scheduler restriction. In the former case, only $N_{PUCCH}$ needs to be configured to a UE. It is also possible, for the purpose of determining PUCCH resources for HARQ-ACK signal transmissions, to jointly consider the sets and subsets of configured PRBs for distributed EPDCCHs and localized EPDCCHs. However, although this can always avoid PUCCH resource collisions without any scheduler restrictions, it also results in larger PUCCH overhead.

In a second approach, the configured set of PRBs for localized or distributed EPDCCH transmissions may be adjusted on a subframe basis, for example, through a transmission of an EPCFICH in every subframe. By adjusting the configured set of PRBs, the UE-specific configured subset of PRBs is also adjusted. As described in U.S. Patent Application No. 61/522,399, titled "Extension of a Physical Downlink Control Channel in a Communication System", the EPCFICH transmission can be in a minimum set of configured PRBs that is always present for distributed EPDCCH transmissions by allocating some respective REs over some subframe symbols to an EPCFICH transmission. The EPCFICH may provide information for the configured PRBs for both distributed and localized EPDCCH transmissions, or two separate EPCFICHs may be used for distributed and localized EPDCCH transmissions, respectively.

Figure 11:
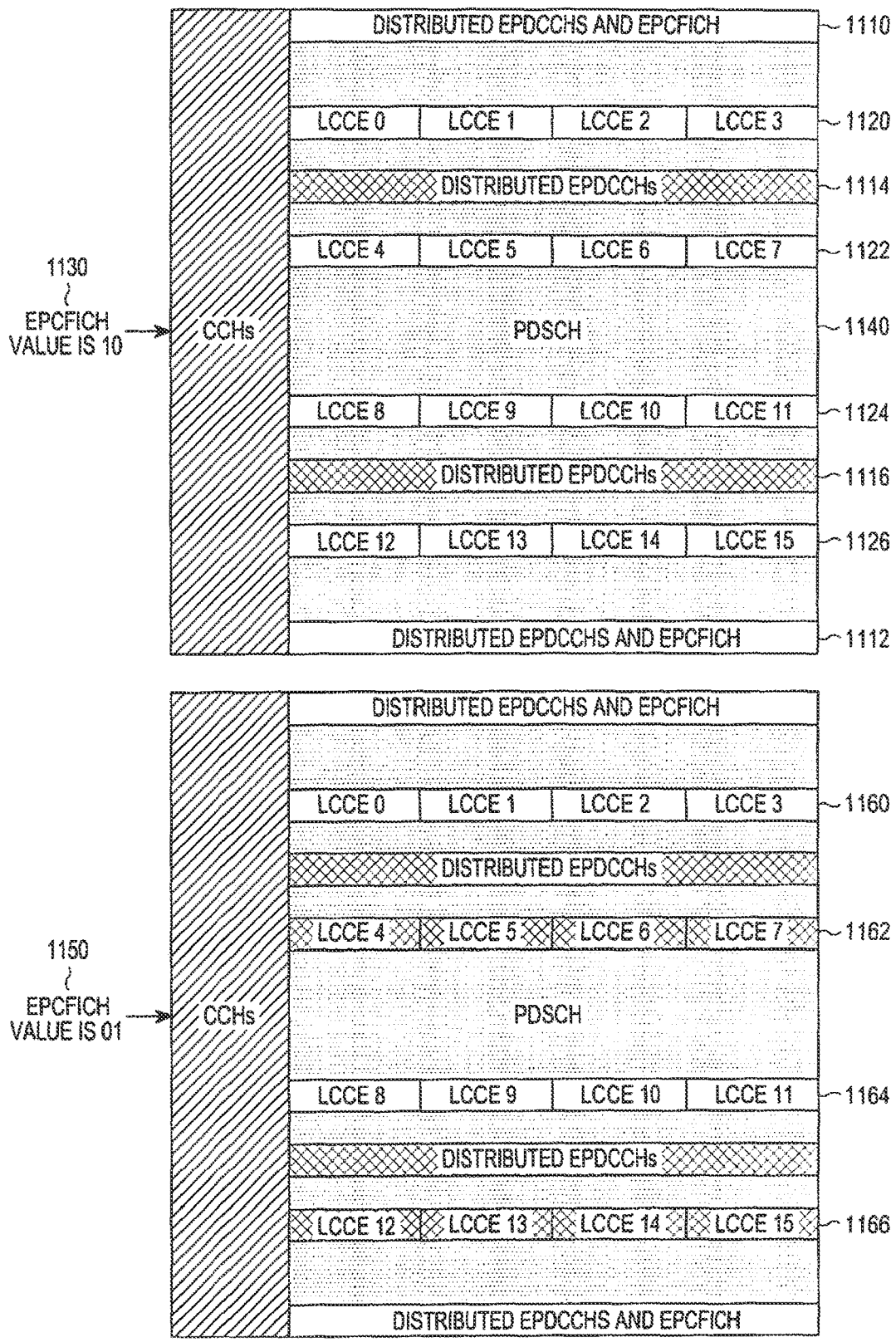
FIG. 11 is a diagram illustrating a use of an EPCFICH to indicate PRBs used for distributed and for localized EPDCCH transmissions in a subframe, according to an embodiment of the present invention.

FIG. 11 is a diagram illustrating a use of an EPCFICH to indicate PRBs used for distributed and for localized EPDCCH transmissions in a subframe, according to an embodiment of the present invention.

Referring to FIG. 11, PRBs 1110 and 1112 always exist for distributed EPDCCH transmissions and may include REs conveying an EPCFICH. Higher layers configure a set of PRBs 1120, 1122, 1124, and 1126 to the UE for localized EPDCCH transmissions and configure an additional set of PRBs 1114 and 1116 to the UE for distributed EPDCCH transmissions. Whether a UE should assume that these additional configured PRBs are used for EPDCCH transmissions in a subframe is indicated by the EPCFICH value. Upon decoding the EPCFICH, a UE can determine whether additional PRBs are used for distributed or localized EPDCCH transmissions in a subframe. Assuming an EPCFICH conveying a value consisting of 2 bits, when the EPCFICH value is '10' 1130, the PRBs 1120, 1122, 1124, and 1126 are also indicated for UEs to assume that they are used for localized EPDCCH transmissions in the respective subframe. The PRBs 1114 and 1116 are indicated as not being used for distributed EPDCCH transmissions, and a UE can assume they are used for PDSCH transmissions 1140.

When the EPCFICH value is '01' 1150, only PRBs 1160 and 1164 are used for localized EPDCCH transmissions while, although configured for potential localized EPDCCH transmissions, PRBs 1162 and 1166 are indicated by the EPCFICH that they are not used. The numbering of LCCEs changes relative to the case that the EPCFICH value is '10' to consider only the PRBs indicated by the EPCFICH value of '01' for localized EPDCCH transmissions. An EPCFICH value of '00' may indicate that only PRBs 1110 and 1112 are used for EPDCCH transmissions in the respective subframe (only distributed EPDCCH transmissions exist in the minimum set of PRBs). An EPCFICH value of '11' may indicate that PRBs 1110, 1112, 1114, and 1116 are used for distributed EPDCCH transmissions and PRBs 1160 and 1164 are used for localized EPDCCH transmissions in the respective subframe.

By adjusting the configured set of PRBs for distributed and localized EPDCCH transmissions per subframe, the PUCCH resources corresponding to EPDCCH detections associated with a PDSCH are also adjusted per subframe. This is beneficial in further reducing the associated PUCCH overhead.

In order to reduce the signaling overhead required for indicating to a UE the PRBs used for a PDSCH transmission, this indication can be in RBGs, where an RBG consists of multiple PRBs and, depending on the allocation type, a UE may be allocated multiple RBGs, instead of multiple PRBs, for a PDSCH transmission. When an RBG includes a PRB configured for EPDCCH transmissions, a UE is indicated PDSCH reception in the reference RBG, and the UE did not detect an EPDCCH in the reference PRB, the UE may determine whether to consider the reference PRB for PDSCH reception depending on an indication by the detected EPCFICH value. If the EPCFICH value indicates that the reference PRB is not used for EPDCCH transmissions in the respective subframe, the UE assumes that PDSCH is also transmitted in the reference PRB. If the EPCFICH value indicates that the reference PRB is used for EPDCCH transmissions in the respective subframe, the UE assumes that PDSCH is not transmitted in the reference PRB and is only transmitted in the remaining PRBs of the reference RBG.

Figure 12:
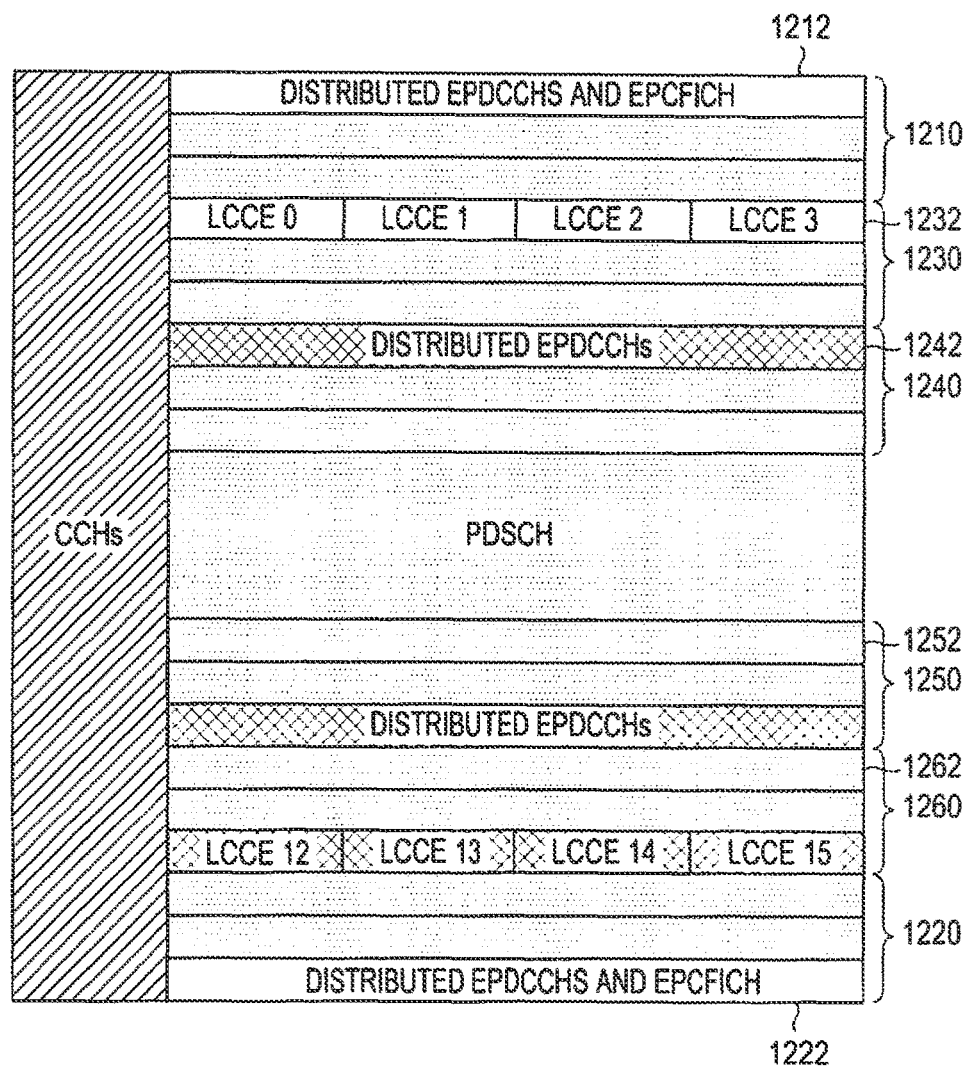
FIG. 12 is a diagram illustrating a process for a UE to determine whether a PRB configured for EPDCCH transmission is used for EPDCCH transmission or for PDSCH transmission in a subframe depending on a detected EPCFICH value, according to an embodiment of the present invention.

FIG. 12 is a diagram illustrating a process for a UE to determine whether a PRB configured for EPDCCH transmission is used for EPDCCH transmission or for PDSCH transmission in a subframe depending on a detected EPCFICH value, according to an embodiment of the present invention.

Referring to FIG. 12, an RBG consists of 3 PRBs and each RBG 1210 and 1220 includes a respective PRB 1212 and 1222 in the minimum set of PRBs used to transmit at least distributed EPDCCH, possibly conveying UE-common control signaling, and EPCFICH. Regardless of a detected EPCFICH value or a detected distributed EPDCCH, a UE is assumed to always discard each of PRBs 1212 and 1222 from a PDSCH reception that includes any of RBGs 1210 or 1220. RBG 1230 includes a PRB 1232 which is configured for localized EPDCCH transmissions and is indicated by the detected EPCFICH value as being used for localized EPDCCH transmissions in the respective subframe. Based on this indication, a UE receiving a PDSCH in RBG 1230 disregards PRB 1232 from the PRBs conveying the PDSCH. RBG 1240 includes a PRB 1242, which is configured for distributed EPDCCH transmissions but is indicated by the detected EPCFICH value as not being used for distributed EPDCCH transmissions in the respective subframe. Based on this indication, a UE receiving a PDSCH in RBG 1240 includes PRB 1242 in the PRBs conveying the PDSCH. The same applies for RBGs 1250 and 1260, which respectively include PRBs 1252 and 1262, and which are respectively configured for distributed and localized EPDCCHs but, based on the detected EPCFICH value, a UE determines that they are not used in the reference subframe to transmit EPDCCHs and assumes that they convey PDSCH.

The second embodiment of the invention considers methods and apparatus for a UE to determine a PUCCH resource for HARQ-ACK signal transmission in response to the detection of an EPDCCH associated with a PDSCH (or SPS release) while also allowing for spatial multiplexing of EPDCCH transmissions. For brevity, the following analysis considers localized EPDCCHs but the same process applies for distributed EPDCCHs.

In a first approach, PUCCH resource collision for HARQ-ACK signal transmissions when respective, spatially multiplexed, EPDCCH transmissions use the same first LCCE, is avoided by restricting the use of spatial multiplexing only to transmissions of EPDCCHs, where at most one such EPDCCH schedules a PDSCH (the remaining EPDCCHs may schedule, for example, PUSCHs). However, in many applications, DL traffic is significantly larger than UL traffic and the previous restriction may significantly diminish the potential overhead reduction from applying spatial multiplexing to EPDCCH transmissions.

In a second approach, PUCCH resource collision for HARQ-ACK signal transmissions when respective spatially multiplexed EPDCCH transmissions (associated with respective PDSCHs) use of the same first LCCE is avoided by incorporating the DMRS port associated with each EPDCCH transmission in the PUCCH resource determination using an implicit mapping. The PUCCH resource can then be determined as set forth in Equation (4).

$$n_{PUCCH} = n_{LCCE} + N_{DMRS} + N_{PUCCH}^{L} \quad (4)$$

where $N_{DMRS}=0,1,2,3$ is the DMRS port number and $N_{PUCCH}^{L}$ is an offset signaled to the UEs by higher layer signaling (if it is different than $N_{PUCCH}$). It is noted that $N_{DMRS}$ may also be limited to 0 or 1 and can have different sets of possible values for EPDCCH transmissions to a UE than for PDSCH transmissions to the same UE. For example, for EPDCCH transmissions to a UE, $N_{DMRS}=0,1,2,3$, while for PDSCH transmissions to the same UE, $N_{DMRS}=0,1$.

Figure 13:
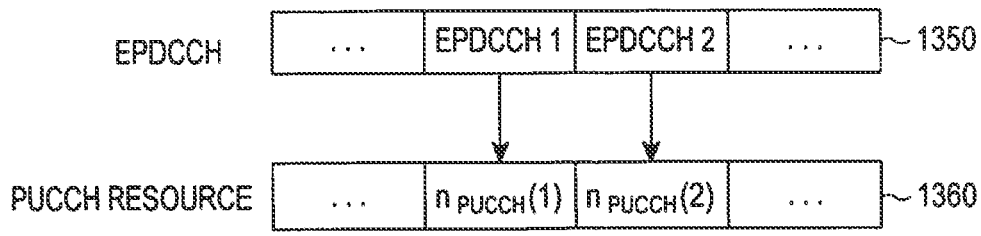
FIG. 13 is a diagram illustrating a PUCCH resource determination for HARQ-ACK signal transmission in response to an EPDCCH detection, according to an embodiment of the present invention.

FIG. 13 is a diagram illustrating a PUCCH resource determination for HARQ-ACK signal transmission in response to an EPDCCH detection, according to an embodiment of the present invention.

Referring to FIG. 13, a first LCCE and DMRS port for transmission of a first EPDCCH to a first UE are, respectively, $n_{LCCE}$ and $N_{DMRS}^{1}$ 1310, while a first LCCE and DMRS port for transmission of a second EPDCCH to a second UE are, respectively, $n_{LCCE}$ and $N_{DMRS}^2$ 1320. The first UE determines a first PUCCH resource for a HARQ-ACK signal transmission in response to the detection of the first EPDCCH as $n_{PUCCH}(1)=n_{CCE}+N_{DMRS}^1+N_{PUCCH}^E$ 1330. The second UE determines a second PUCCH resource for a HARQ-ACK signal transmission in response to the detection of the second EPDCCH as $n_{PUCCH}(2)=n_{LCCE}+N_{DMRS}^2+N_{PUCCH}^E$ 1340. Therefore, even through multiple EPDCCHs may have the same LCCE as the first one for their transmissions, a one-to-one mapping exists among the EPDCCHs 1350 and respective PUCCH resources 1360, and collisions can be avoided.

The implicit PUCCH resource determination for HARQ-ACK signal transmission in accordance to the second approach avoids a potential PUCCH resource collision but it also introduces some scheduling restrictions. For example, as the UE with EPDCCH transmission using DMRS port 1 uses PUCCH resource $n_{PUCCH}=n_{LCCE}+1+N_{PUCCH}^L$ the scheduler should ensure this PUCCH resource is not used for another HARQ-ACK signal transmission. This implies that if the respective EPDCCH transmissions consist of one LCCE, the next LCCE is not used for another EPDCCH transmission scheduling a PDSCH. Therefore, the functionality of the second approach requires that either transmissions of a number of spatially multiplexed EPDCCHs consist of at least a same or larger number of LCCEs or, in case they consist of a single LCCE, that the next LCCE is either not used for EPDCCH transmission or it is used for the transmission of EPDCCHs scheduling PUSCH transmissions.

In a third approach, PUCCH resource collision for HARQ-ACK signal transmissions when respective, spatially multiplexed, EPDCCH transmissions use a same first LCCE, is avoided by assigning a separate PUCCH offset for each DMRS port. Although the previous restrictions associated with the second approach are not significant, they can be avoided by the third approach at the expense of some additional PUCCH overhead. Then, a PUCCH resource for HARQ-ACK signal transmission associated with antenna port $N_{DMRS}$ can be obtained as set forth in Equation (5).

$$n_{PUCCH}=n_{L-CCE}+N_{PUCCH}^{L,N_{DMRS}} \quad (5)$$

where $N_{PUCCH}^{L,N_{DMRS}}$ is a PUCCH resource offset assigned to DMRS port $N_{DMRS}$.

Figure 14:
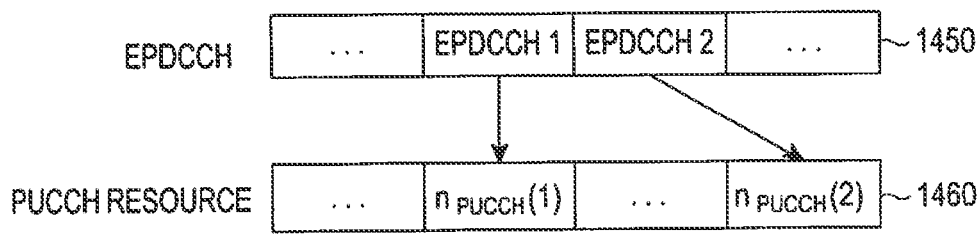
FIG. 14 is a diagram illustrating an assignment of different offsets for determining a PUCCH resource for HARQ-ACK transmission associated with different DMRS antenna ports, according to an embodiment of the present invention.

FIG. 14 is a diagram illustrating an assignment of different offsets for determining a PUCCH resource for HARQ-ACK transmission associated with different DMRS antenna ports, according to an embodiment of the present invention.

Referring to FIG. 14, a first LCCE and a DMRS port for a transmission of a first EPDCCH to a first UE are, respectively, $n_{LCCE}$ and $N_{DMRS}^1$ 1410, while a first L-CCE and a DMRS port for a transmission of a second EPDCCH to a second UE are, respectively, $n_{LCCE}$ and $N_{DMRS}^2$ 1420. Each of the previous two EPDCCHs is associated with a respective PDSCH. The first UE determines a first PUCCH resource for a HARQ-ACK signal transmission in response to the detection of the first EPDCCH as $n_{PUCCH}(1)=n_{LCCE}+N_{PUCCH}^{E,N_{DMRS}^1}$ 1430, where $N_{PUCCH}^{E,N_{DMRS}^1}$ is the PUCCH resource offset associated with $N_{DMRS}^1$. The second UE determines a second PUCCH resource for a HARQ-ACK signal transmission in response to the detection of the second EPDCCH as $n_{PUCCH}(2)=n_{LCCE}+N_{PUCCH}^{L,N_{DMRS}^1}$ 1440, where $N_{PUCCH}^{L,N_{DMRS}^2}$ is the PUCCH resource offset associated with $N_{DMRS}^2$. Therefore, even though multiple EPDCCHs may have a same LCCE as a first one for their transmissions, a one-to-one mapping exists among EPDCCHs 1450 and respective PUCCH resources 1460, and collisions can be avoided.

In a fourth approach, PUCCH resource collision for HARQ-ACK signal transmissions when respective, spatially multiplexed, EPDCCH transmissions use the same first LCCE, is avoided by including a HARQ-ACK PUCCH Resource Offset (HPRO) field in the DCI formats conveyed by EPDCCHs scheduling respective PDSCHs. The HPRO serves to index the PUCCH HARQ-ACK resource relative to a nominal HARQ-ACK resource. A similar principle of a HARQ-ACK PUCCH Resource Index (HPRI) was described in U.S. patent application Ser. No. 12/986,675, titled "RESOURCE INDEXING FOR ACKNOWLEDGEMENT SIGNALS IN RESPONSE TO RECEPTIONS OF MULTIPLE ASSIGNMENTS" for a different use. As it is subsequently described, embodiments of the present invention considers an HPRO field in a respective DCI format acting as an offset to a PUCCH resource dynamically determined by a UE, rather than a direct indicator of a PUCCH resource from a predetermined configured set of PUCCH resources. In general, EPDCCHs transmissions can be localized (sharing a same first LCCE) or can be distributed (sharing a same first DCCE), or can be localized and distributed (sharing a same first LCCE and first DCCE, respectively).

Figure 15:
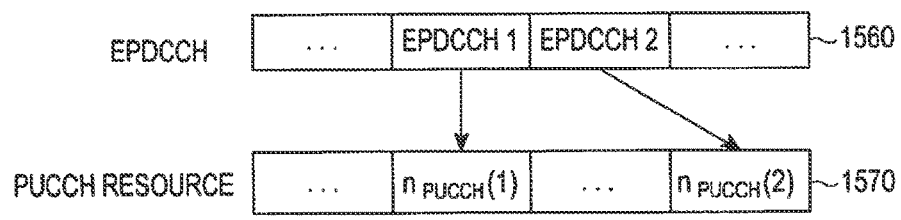
FIG. 15 is a diagram illustrating a use of HPRO to separate PUCCH resources for HARQ-ACK signal transmissions from different UEs in response to respective detections of EPDCCHs, according to an embodiment of the present invention.

FIG. 15 is a diagram illustrating a use of HPRO to separate PUCCH resources for HARQ-ACK signal transmissions from different UEs in response to respective detections of EPDCCHs, according to an embodiment of the present invention.

Referring to FIG. 15, a HPRO 1510 consists of 2 bits where, for example, '00' maps to −2, '01' maps to −1, '10' maps to 0 and '11' maps to 1. The DCI format conveyed by a first EPDCCH to a first UE indicates a value of HPRO(1) for the HPRO field 1520. The DCI format conveyed by a second EPDCCH to a second UE indicates a value of HPRO(2) for the HPRO field 1530. The first UE determines a first PUCCH resource for a HARQ-ACK signal transmission in response to the detection of the first EPDCCH as $n_{PUCCH}(1)=n_{LCCE}(1)+\text{HPRO}(1)+N_{PUCCH}^L$ 1540 where $n_{LCCE}(1)$ is the first CCE of the first EPDCCH. The second UE determines a second PUCCH resource for a HARQ-ACK signal transmission in response to the detection of the second EPDCCH as $n_{PUCCH}(2)=n_{LCCE}(2)+\text{HPRO}(2)+N_{PUCCH}^L$ 1550 where $n_{LCCE}(2)$ is the first LCCE of the second EPDCCH. The value of $n_{LCCE}(1)$ may be the same as the value of $n_{LCCE}(2)$ in which case PUCCH resource collision is avoided by having HPRO(1) be different than HPRO(2), or the value of $n_{LCCE}(1)$ may be different than the value of $n_{LCCE}(2)$ in which case PUCCH resource collision is avoided by having $n_{LCCE}(1)+\text{HPRO}(1)$ be different than $n_{LCCE}(2)+\text{HPRO}(2)$. Therefore, even through multiple EPDCCHs may have a same LCCE as the first one, a one-to-one mapping exists among EPDCCHs 1560 and respective PUCCH resources 1570, and collisions can be avoided.

A PUCCH resource for an HARQ-ACK signal transmission in response to a EPDCCH detection scheduling a PDSCH can be determined as $n_{PUCCH}=n_{ECCE}+\text{HPRO}+N_{PUCCH}^E$ where $n_{ECCE}$ is an ECCE with a lowest index for a respective EPDCCH ($n_{ECCE}=n_{DCCE}$ for a distributed EPDCCH and $n_{ECCE}=n_{LCCE}$ for a localized EPDCCH), HPRO is the mapped integer value of the binary HPRO field in a DCI format conveyed by a respective EPDCCH (for example, binary HPRO values of 00, 01, 10, and 11 may respectively map to integer HPRO values of −1, 0, 1, 2), and $N_{PUCCH}^E$ is a UE-specific PUCCH resource offset per PRB set ($N_{PUCCH}^E = N_{PUCCH}^D$ for an distributed EPDCCH transmission and $N_{PUCCH}^E = N_{PUCCH}^L$ for a localized EPDCCH transmission). When UE may detect either distributed EPDCCH or a localized EPDCCH in a subframe, it may be configured with both a $N_{PUCCH}^D$ PUCCH resource offset value and a PUCCH resource offset value and use the former if an HARQ-ACK transmission is in response to a distributed EPDCCH detection or the latter if an HARQ-ACK transmission is in response to a localized EPDCCH detection. Therefore, an amount of PUCCH resource overlapping for HARQ-ACK transmissions corresponding to PDCCH, distributed EPDCCH, or localized EPDCCH transmissions can be controlled through $N_{PUCCH}^E$, while PUCCH resource collisions when overlapping occurs can be resolved through an HPRO field.

Although the use of an HPRO field in a DCI format scheduling a PDSCH was described with respect to the use of spatial multiplexing for localized EPDCCHs sharing a same first LCCE, its use can be extended in a same manner for distributed EPDCCHs sharing a same first DCCE and for a localized EPDCCH and a distributed EPDCCH having a same number for their respective first LCCE and DCCE, respectively. Also, even through legacy PUCCH resources cannot be indexed by HPRO, the use of HPRO can still be applied for avoiding PUCCH resource collision for HARQ-ACK signal transmissions in response to a PDCCH detection and to a distributed EPDCCH or a localized EPDCCH detection by appropriately indexing the resource for the latter. In this manner, full overlap or partial overlap of PUCCH resources for HARQ-ACK signal transmissions in response to PDCCH, localized EPDCCH, and distributed EPDCCH detections can be supported while avoiding collisions with minimal scheduler restrictions.

The third embodiment of the invention considers methods and apparatus for a UE to transmit an HARQ-ACK signal in a PUCCH using transmitter antenna diversity in response to the detection of an EPDCCH associated with a PDSCH.

A UE is configured by a NodeB whether or not to use transmitter antenna diversity for HARQ-ACK signal transmissions in a PUCCH. As a localized EPDCCH transmission in a PRB benefits from beamforming or FDS, it is likely to require less LCCEs than the DCCEs for a distributed EPDCCH transmission of a same DCI format. Consequently, for the same DCI format, localized EPDCCH transmissions over a single LCCE are more likely than distributed EPDCCH transmissions over a single DCCE as the former typically experience a higher SINR and can therefore be transmitted with a higher coding rate or modulation order thereby requiring fewer resources.

The increased likelihood of a localized first EPDCCH transmission being over a single LCCE places strong restrictions in a use of transmitter antenna diversity for a respective HARQ-ACK signal when the conventional method is used to derive a PUCCH resource for the second antenna. This is because this second resource corresponds to the next LCCE, after the first LCCE of the first EPDCCH transmission, which is likely to be the first LCCE of a second EPDCCH transmission. PUCCH resource collision will then occur unless the second EPDCCH is not associated with a PDSCH. However, this is often not possible as DL traffic is typically larger than UL traffic and channel state information required by a NodeB to transmit localized EPDCCHs is associated with PDSCH transmissions and not with PUSCH transmissions.

In a first approach, transmitter antenna diversity for a HARQ-ACK signal from a UE configured to use it is adaptively applied depending on whether the detected EPDCCH is a distributed or a localized one. In the former case, a UE transmits a HARQ-ACK signal using transmitter antenna diversity. In the latter case, a UE transmits a HARQ-ACK signal using a single transmitter antenna (predetermined or UE selected).

Figure 16:
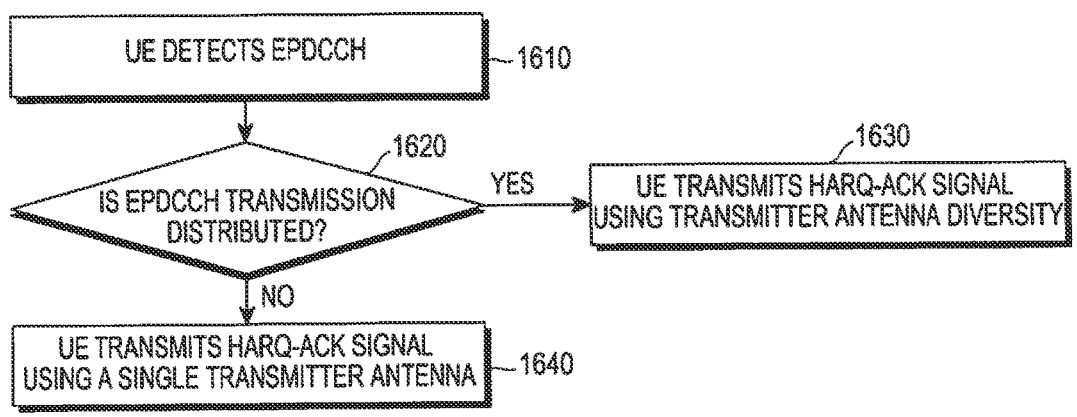
FIG. 16 is a diagram illustrating an adaptive use of antenna diversity for transmitting an HARQ-ACK signal in response to an EPDCCH detection depending on whether the EPDCCH transmission is localized or distributed, according to an embodiment of the present invention.

FIG. 16 is a diagram illustrating an adaptive use of antenna diversity for transmitting an HARQ-ACK signal in response to an EPDCCH detection depending on whether the EPDCCH transmission is localized or distributed, according to an embodiment of the present invention.

Referring to FIG. 16, a UE detects an EPDCCH associated with a PDSCH, in step 1610. In step 1620, it is determined whether the EPDCCH transmission is distributed. If the EPDCCH transmission is distributed, the UE transmits a respective HARQ-ACK signal using transmitter antenna diversity, in step 1630. A PUCCH resource for a first transmitter antenna is determined from the number of the first DCCE of the EPDCCH, $n_{DCCE}$. The PUCCH resource for the second antenna is determined from $n_{DCCE}+1$, for example as in Equation (1), or as in one of the previously described approaches for the first or second embodiments of the invention, where instead of a single PUCCH resource a pair of PUCCH resources is considered. If the EPDCCH transmission is localized, or not distributed, the UE transmits the respective HARQ-ACK signal using a single transmitter antenna, in step 1640.

In a second approach, transmitter antenna diversity for a HARQ-ACK signal is adaptively applied in case the detected EPDCCH is a localized one depending on the respective ECCE aggregation level. If only one LCCE is used for the transmission of the detected EPDCCH, transmitter antenna diversity for the respective HARQ-ACK signal is not applied. If multiple LCCEs are used for the transmission of the detected EPDCCH, transmitter antenna diversity for the respective HARQ-ACK signal is applied. For a distributed detected EPDCCH, transmitter antenna diversity for the respective HARQ-ACK signal transmission is always applied (when configured) without any restriction on the respective DCCE aggregation level.

Figure 17:
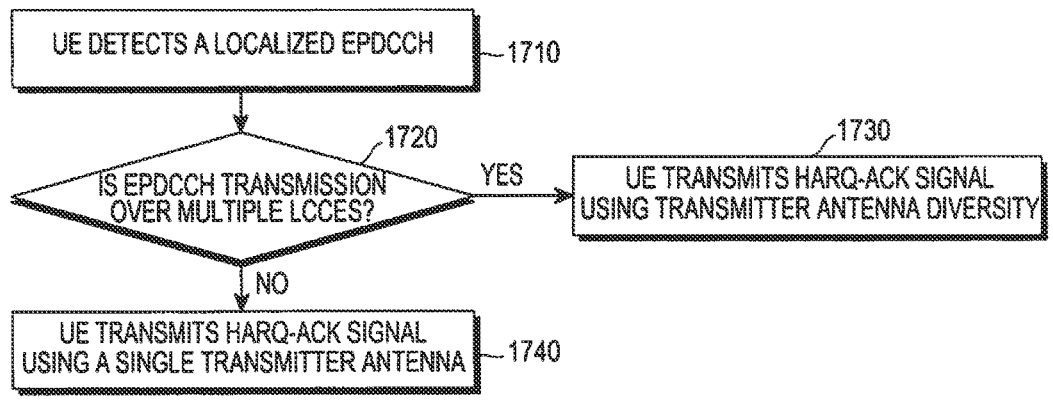
FIG. 17 is a diagram illustrating an adaptive use of transmitter antenna diversity for an HARQ-ACK signal depending on whether or not a respective detected EPDCCH was transmitted with one ECCE or with multiple ECCEs, according to an embodiment of the present invention.

FIG. 17 is a diagram illustrating an adaptive use of transmitter antenna diversity for a HARQ-ACK signal depending on whether or not a respective detected EPDCCH was transmitted with one ECCE or with multiple ECCEs, according to an embodiment of the present invention.

Referring to FIG. 17, a UE detects a localized EPDCCH associated with a PDSCH, in step 1710. In step 1720, it is determined whether the EPDCCH transmission consists of multiple LCCEs. If the EPDCCH transmission consists of multiple LCCEs, the UE transmits a respective HARQ-ACK signal using transmitter antenna diversity, in step 1730. The PUCCH resource for the first transmitter antenna is determined from a number of the first LCCE of the EPDCCH, $n_{LCCE}$. The PUCCH resource for the second antenna is determined from $n_{LCCE}+1$. If the EPDCCH transmission consists of a single LCCE, the UE transmits the respective HARQ-ACK signal using a single transmitter antenna, in step 1740.

When the PUCCH resources for HARQ-ACK signal transmission in response to PDCCH, distributed EPDCCH, and localized EPDCCH detections are at least partially shared, resource collision when using transmitter antenna diversity may become more difficult to avoid. However, the use of a HPRO field in DCI formats conveyed by EPDCCH can significantly alleviate scheduler restrictions for avoiding PUCCH resource collisions when transmitting HARQ-ACK signals using transmitter antenna diversity. The UE then determines a PUCCH resource for HARQ-ACK signal transmission from the second antenna as $n_{PUCCH} = n_{ECCE} + HPRO + N_{PUCCH}^E$.

In addition to the LCCE aggregation level in case of localized EPDCCH, the DMRS antenna port may also be considered in the adaptive use of transmitter antenna diversity (when configured) for HARQ-ACK signal transmission. If the DMRS antenna port is not the first one, it may be associated with the use of spatial EPDCCH multiplexing. To avoid an increased probability of PUCCH resource collision in this case, since use of spatial EPDCCH multiplexing is assumed to be transparent to UEs, transmitter antenna diversity for HARQ-ACK signaling may not apply if the DMRS antenna port for a respective EPDCCH is not the first one.

Furthermore, a dynamic determination by a UE as to whether it shall apply transmitter antenna diversity (when configured) for HARQ-ACK signaling can be based on the modulation scheme used for the transmissions of the respective EPDCCH. If QAM16 is used, a UE can be assumed to have good link quality and small path-loss to a NodeB and may not apply transmitter antenna diversity for a respective HARQ-ACK signal. The reverse applies when QPSK is used to transmit a respective EPDCCH.

Dynamic indication of whether a UE should apply transmitter antenna diversity (when configured) for HARQ-ACK signaling can be supported through an inclusion of a respective 1-bit field (with, for example, 0 indicating transmitter antenna diversity and 1 indicating single transmitter antenna) in a DCI format conveyed by each EPDCCH associated with a PDSCH.

The fourth embodiment of the present invention considers methods and apparatus for a UE to determine a PUCCH resource for a HARQ-ACK signal transmission in response to an EPDCCH detection, when possible ECCE aggregation levels for an EPDCCH type (distributed or localized) vary per subframe and, in particular, when an existence of an aggregation level of 1 ECCE varies per subframe.

Figure 4:
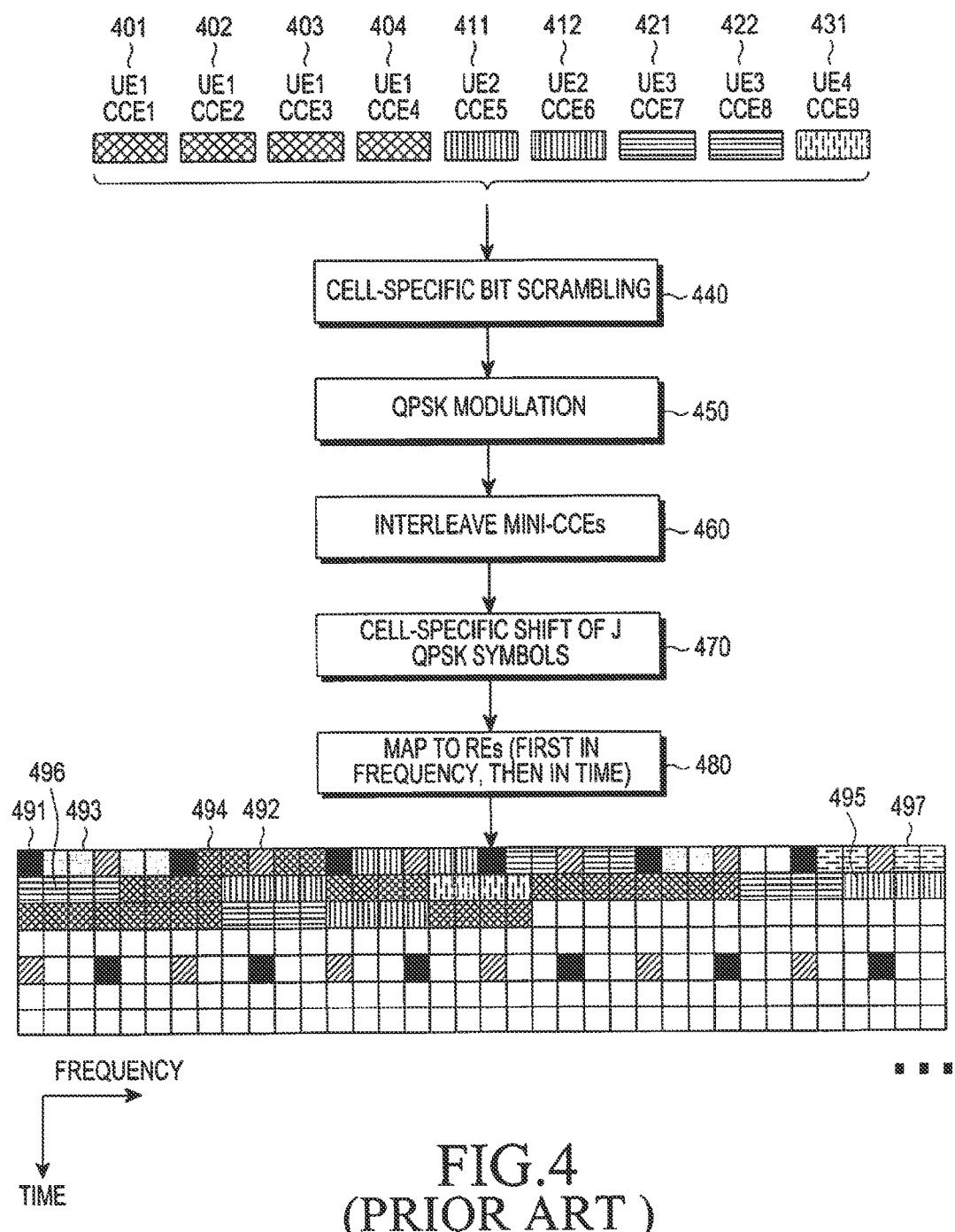
FIG. 4 is a diagram illustrating a transmission process of DCI formats in respective PDCCHs.
Figure 5:
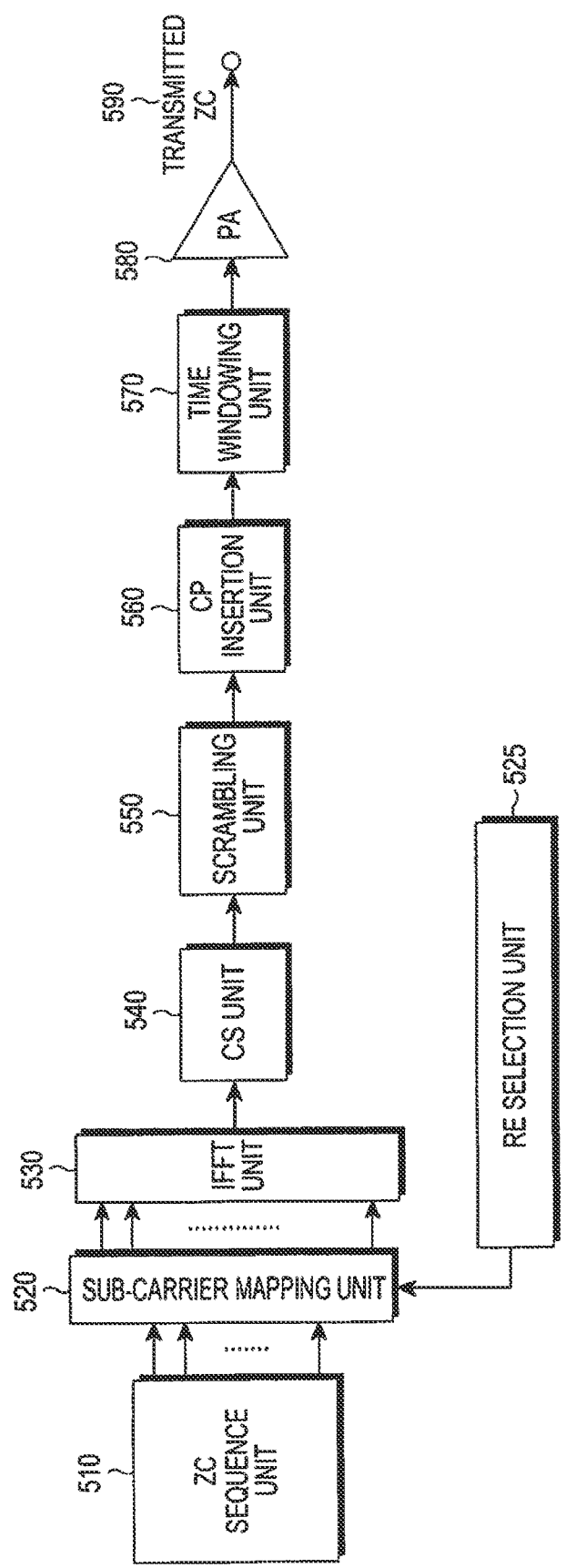
FIG. 5 is a block diagram illustrating a UE transmitter for a ZC sequence.
Figure 6:
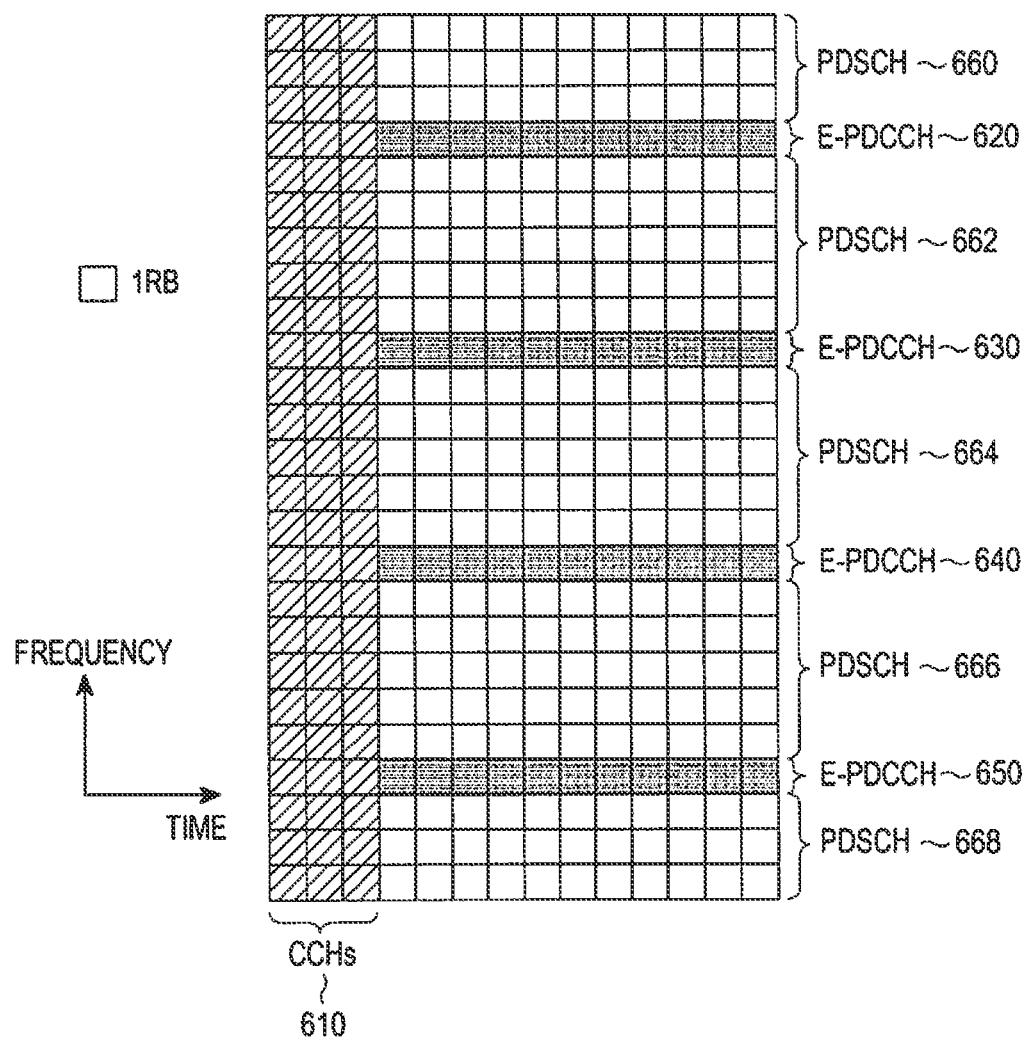
FIG. 6 is a diagram illustrating EPDCCH transmissions in a DL subframe.

The ECCE aggregation levels that may be used for an EPDCCH transmission may vary per subframe in order to adjust to a respective varying number of REs available for EPDCCH transmission in respective PRBs assigned to a UE in a subframe. For example, in FIG. 4, REs available for localized EPDCCH transmissions in a PRB exclude REs used by a conventional DL control region in the first 3 OFDM symbols, and REs used for transmitting various RS types (DMRS, CRS, etc.). Therefore, in FIG. 4, a total number of REs available for localized EPDCCH transmissions in a PRB is equal to 96, and an LCCE size is equal to 24 REs for 4 LCCEs in a PRB. Assuming QPSK modulation conveying 2 bits per RE and typical payloads of DCI formats exceeding 40 bits, a resulting code rate for a DCI format transmission with an aggregation level of 1 LCCE is at least about 0.83 (40/(2*24)), which is typically too high to reliably convey a DCI format. Conversely, if only 1 OFDM symbol is used by a conventional DL control region, a total number of REs available for localized EPDCCH transmissions in a PRB is equal to 120, and an LCCE size is 30 REs for 4 LCCEs per PRB. In such case, a resulting code rate for transmitting a DCI format consisting of at least 40 bits with an aggregation level of 1 LCCE is at least about 0.67 (40/(2*30)), and the DCI format transmission can be reliably conveyed to UEs experiencing at least moderate DL SINRs. Therefore, depending on whether a number of REs per PRB is larger than or smaller than a threshold, ECCE aggregation levels used for a respective EPDCCH transmission can vary. This approach for varying the supported ECCE aggregation levels per subframe in order to account for a variable number of REs per PRB, when transmitting an EPDCCH from a NodeB and detecting an EPDCCH at a UE, is described in U.S. Patent Application No. 61/552,846, titled "Search Process for Physical Downlink Control Channels in a Communication System".

With respect to determining a resource for a HARQ-ACK signal transmission from a UE in response to a respective EPDCCH detection, the previously described variability in ECCE aggregation levels per subframe can be considered to reduce a respective resource overhead for transmitting HARQ-ACK signals. When a minimum aggregation level of one ECCE can be used in a subframe to transmit from a NodeB an EPDCCH to a UE, a respective resource for a HARQ-ACK signal transmission from a UE can be based on a first (lowest) ECCE of a respective EPDCCH, for example, as described in Equation (3). However, when only a minimum aggregation level of two ECCEs can be used in a subframe to transmit from a NodeB an EPDCCH to a UE, determining a respective resource for a HARQ-ACK signal transmission from a UE from a first (lowest) ECCE of a respective EPDCCH will result in unnecessary UL overhead as at least every other resource for HARQ-ACK signal transmissions will remain unused. In this case, the resource $n_{PUCCH}^E$ for a HARQ-ACK signal transmission can be determined based on Equation (6) below.

$$n_{PUCCH}^E = n_{ECCE} - \lceil \frac{n_{ECCE}}{2} \rceil + N_{PUCCH}^E = \lfloor \frac{n_{ECCE}}{2} \rfloor + N_{PUCCH}^E \quad (6)$$

where $\lceil \ \rceil$ is the "ceiling" function which rounds a number to its next integer, $\lfloor \ \rfloor$ is the "floor" function which rounds a number to its previous integer, $n_{ECCE}$ is the first (lowest) ECCE of a respective EPDCCH, and $N_{PUCCH}^E$ is an offset configured to a UE for a respective set of EPDCCH PRBs. Alternatively, $n_{PUCCH}^E$ can be determined as $$n_{PUCCH}^E = n_{E\text{-}CCE} - \lfloor \frac{n_{E\text{-}CCE}}{2} \rfloor + N_{PUCCH}^E = \lceil \frac{n_{E\text{-}CCE}}{2} \rceil + N_{PUCCH}^E.$$

Figure 18:
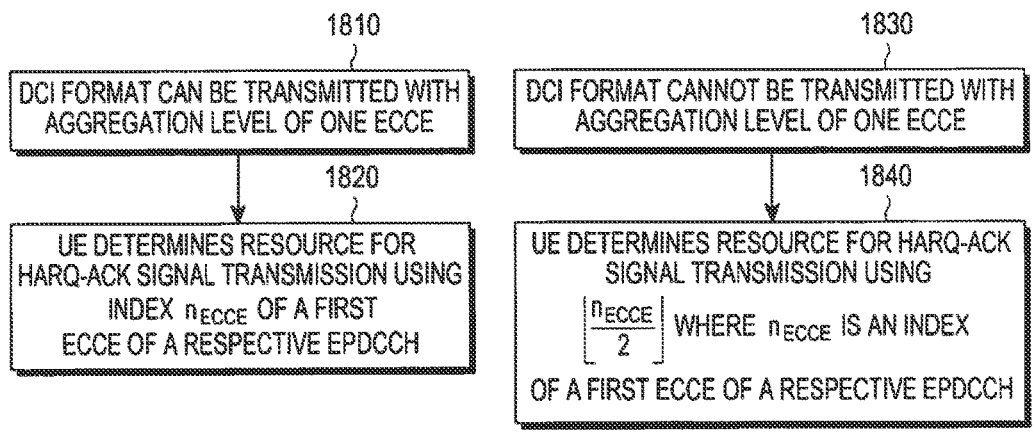
FIG. 18 is a diagram illustrating an adaptive functionality for a UE to determine a resource for a HARQ-ACK signal transmission in response to an EPDCCH detection, according to an embodiment of the present invention.

FIG. 18 is a diagram illustrating an adaptive functionality for a UE to determine a resource for a HARQ-ACK signal transmission in response to an EPDCCH detection, according to an embodiment of the present invention.

Referring to FIG. 18, a DCI format associated with PDSCH scheduling to a UE through a respective EPDCCH is transmitted with an aggregation level of one ECCE, in step 1810 (as determined by a UE from a number of REs available for EPDCCH transmission in a PRB in a respective subframe). A UE uses the first (lowest) ECCE index, $n_{ECCE}$, to determine a resource for a respective HARQ-ACK signal transmission, in step 1820. Conversely, a same DCI format is only transmitted through an EPDCCH using an aggregation level of at least two ECCEs, in step 1830. A respective resource for a HARQ-ACK signal transmission is determined as in the case of an aggregation level of one ECCE by additionally subtracting $$\lceil \frac{n_{ECCE}}{2} \rceil$$

from $n_{ECCE}$ or, equivalently, using $$\left\lfloor \frac{n_{ECCE}}{2} \right\rfloor$$

instead of $n_{ECCE}$ in step 1840.

While the present invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method for wireless communications, the method comprising:
    transmitting configuration information comprising a resource start offset and information for a transmission type of an enhanced physical downlink control channel (EPDCCH);
    transmitting, to a user equipment (UE), downlink control information (DCI) using at least one antenna port of a base station on the EPDCCH using at least one of control channel elements (CCEs);
    determining a resource of a physical uplink control channel (PUCCH) based on a first CCE of the at least one of the CCEs, information in the DCI, and the resource start offset in the configuration information, in response to the transmission type of the EPDCCH being distributed transmission; and
    receiving a hybrid automatic repeat request acknowledgement (HARQ-ACK) signal on the determined resource.

2. The method of claim 1, wherein the information in the DCI is a resource offset used for determining the resource of the PUCCH.

3. The method of claim 2, wherein the resource offset is two bits.

4. The method of claim 1, wherein, in response to the transmission type of the EPDCCH being distributed transmission, an index of the resource of the PUCCH is determined as a sum of a first parameter determined from the first CCE, a second parameter determined from the information in the DCI, and a third parameter configured by the resource start offset.

5. The method of claim 1, further comprising:
    determining the resource of the PUCCH based on the first CCE of the at least one of the CCEs, the at least one antenna port, information in the DCI, and the resource start offset in the configuration information, in response to the transmission type of EPDCCH being localized transmission.

6. The method of claim 5, wherein the information in the DCI is a resource offset used for determining the resource of the PUCCH.

7. The method of claim 6, wherein the resource offset is two bits.

8. The method of claim 1, wherein, in response to the transmission type of the EPDCCH being localized transmission, an index of the resource of the PUCCH is determined as a sum of a first parameter determined from the first CCE, a second parameter determined from the at least one antenna port, a third parameter determined from the information in the DCI, and a fourth parameter configured by the resource start offset.

9. The method of claim 1, wherein the EPDCCH consists of the at least one of the CCEs in a time resource region for downlink data transmission.

10. An apparatus of a base station for wireless communications, the apparatus comprising:
    a transmitter configured to transmit configuration information comprising a resource start offset and information for a transmission type of an enhanced physical downlink control channel (EPDCCH), and transmit, to a user equipment (UE), downlink control information (DCI) using at least one antenna port of the base station on the EPDCCH using at least one of control channel elements (CCEs);
    a processor configured to determine a resource of a physical uplink control channel (PUCCH) based on a first CCE of the at least one of the CCEs, information in the DCI, and the resource start offset in the configuration information, in response to the transmission type of the EPDCCH being configured for distributed transmission; and
    a receiver configured to receive a hybrid automatic repeat request acknowledgement (HARQ-ACK) signal on the determined resource.

11. The apparatus of claim 10, wherein the information in the DCI is a resource offset used for determining the resource of the PUCCH.

12. The apparatus of claim 11, wherein the resource offset is two bits.

13. The apparatus of claim 10, wherein, in response to the transmission type of the EPDCCH being distributed transmission, an index of the resource of the PUCCH is determined as a first parameter determined from the first CCE, a second parameter determined from the DCI, and a third parameter configured by the resource start offset.

14. The apparatus of claim 10, wherein the processor is further configured to determine the resource of the PUCCH based on the first CCE of the at least one of the CCEs, the at least one antenna port, information in the DCI, and the resource start offset in the configuration information, in response to the transmission type of EPDCCH being localized transmission.

15. The apparatus of claim 14, wherein the information in the DCI is a resource offset used for determining the resource of the PUCCH.

16. The apparatus of claim 15, wherein the resource offset is two bits.

17. The apparatus of claim 10, wherein, in response to the transmission type of the EPDCCH being localized transmission, an index of the resource of the PUCCH is determined as a sum of a first parameter determined from the first CCE, a second parameter determined from the at least one antenna port, a third parameter determined from the DCI, and a fourth parameter configured by the resource start offset.

18. The apparatus of claim 10, wherein the EPDCCH consists of the at least one of the CCEs in a time resource region for downlink data transmission.

* * * * *